(12) United States Patent
Oh et al.

(10) Patent No.: US 9,866,804 B2
(45) Date of Patent: Jan. 9, 2018

(54) BROADCAST SIGNAL TRANSMISSION APPARATUS, BROADCAST SIGNAL RECEPTION APPARATUS, BROADCAST SIGNAL TRANSMISSION METHOD, AND BROADCAST SIGNAL RECEPTION METHOD

(71) Applicant: LG ELECTRONICS INC., Seoul (KR)

(72) Inventors: Sejin Oh, Seoul (KR); Woosuk Ko, Seoul (KR); Woosuk Kwon, Seoul (KR); Jangwon Lee, Seoul (KR); Sungryong Hong, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/036,704

(22) PCT Filed: Apr. 9, 2015

(86) PCT No.: PCT/KR2015/003571
§ 371 (c)(1),
(2) Date: May 13, 2016

(87) PCT Pub. No.: WO2015/156618
PCT Pub. Date: Oct. 15, 2015

(65) Prior Publication Data
US 2017/0163945 A1 Jun. 8, 2017

Related U.S. Application Data

(60) Provisional application No. 61/977,593, filed on Apr. 9, 2014.

(51) Int. Cl.
*H04N 7/52* (2011.01)
*H04N 7/01* (2006.01)
(Continued)

(52) U.S. Cl.
CPC ......... *H04N 7/52* (2013.01); *H04L 29/06176* (2013.01); *H04L 65/00* (2013.01);
(Continued)

(58) Field of Classification Search
CPC .......... H04N 7/52; H04N 7/01; H04N 21/235; H04N 21/2365; H04L 29/06176; H04L 65/00
See application file for complete search history.

(56) References Cited

U.S. PATENT DOCUMENTS

2007/0050833 A1 3/2007 Park
2011/0099594 A1* 4/2011 Chen ................ H04N 21/23439
725/105
(Continued)

FOREIGN PATENT DOCUMENTS

KR 10-2007-0027070 A 3/2007
KR 10-2010-0025453 A 3/2010
(Continued)

OTHER PUBLICATIONS

3GPP, "3rd Generation Partnership Project; Technical Specification Group Services and System Aspects; Multimedia Broadcast/Multicast Service (MBMS); Protocols and codecs (Release 12)," 3GPP TS 26.346 V12.1.0, Mar. 2014 (downloaded by EPO on Mar. 7, 2014), pp. 1-181, XP050838999.
(Continued)

*Primary Examiner* — Michael Teitelbaum
(74) *Attorney, Agent, or Firm* — Birch, Stewart, Kolasch & Birch, LLP

(57) ABSTRACT

The present invention relates to an apparatus and a method for transmitting and receiving a broadcast signal including signaling information. One embodiment of the present invention may provide a broadcast signal transmission method comprising the steps of: generating a media stream
(Continued)

by encoding media data; generating signaling information signaling the media stream; multiplexing the generated media stream and the signaling information; and transmitting a broadcast signal including the multiplexed media stream and the signaling information. According to one embodiment of the present invention, the signaling information may include meta data on the media stream.

6 Claims, 34 Drawing Sheets

(51) Int. Cl.
*H04N 21/235* (2011.01)
*H04N 21/236* (2011.01)
*H04L 29/06* (2006.01)
*H04N 21/2365* (2011.01)

(52) U.S. Cl.
CPC ............ *H04N 7/01* (2013.01); *H04N 21/235* (2013.01); *H04N 21/236* (2013.01); *H04N 21/2365* (2013.01)

(56) References Cited

U.S. PATENT DOCUMENTS

| | | |
|---|---|---|
| 2013/0304933 A1 | 11/2013 | Kim et al. |
| 2014/0002598 A1 | 1/2014 | Kim et al. |
| 2014/0019587 A1* | 1/2014 | Giladi ............... H04L 29/06476 709/217 |

FOREIGN PATENT DOCUMENTS

| | | |
|---|---|---|
| KR | 10-2012-0056643 A | 6/2012 |
| KR | 10-2013-0127211 A | 11/2013 |

OTHER PUBLICATIONS

ETSI, "Hybrid Broadcast Broadband TV," ETSI TS 102 796 V1.2.1, Nov. 2012, pp. 1-88, XP055177671.

* cited by examiner

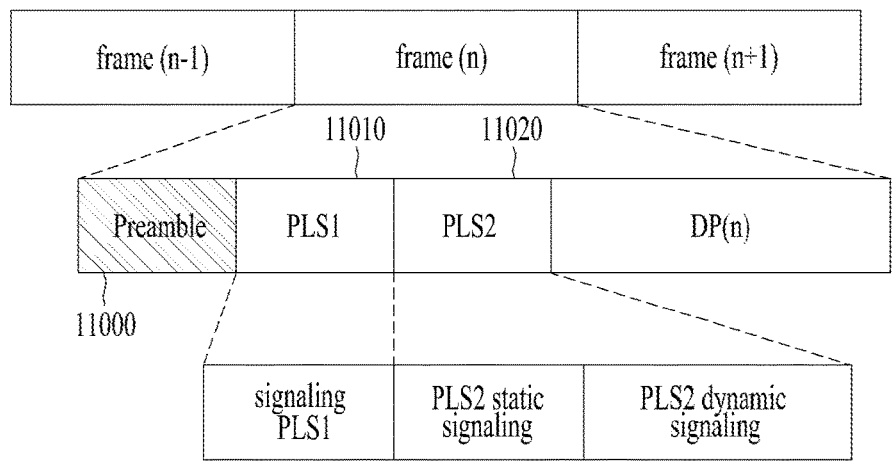

FIG. 12

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4<br> |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 13

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
|     DP_ID | 6 |
|     DP_START | 15 (or13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC 32 | 32 |

FIG. 20
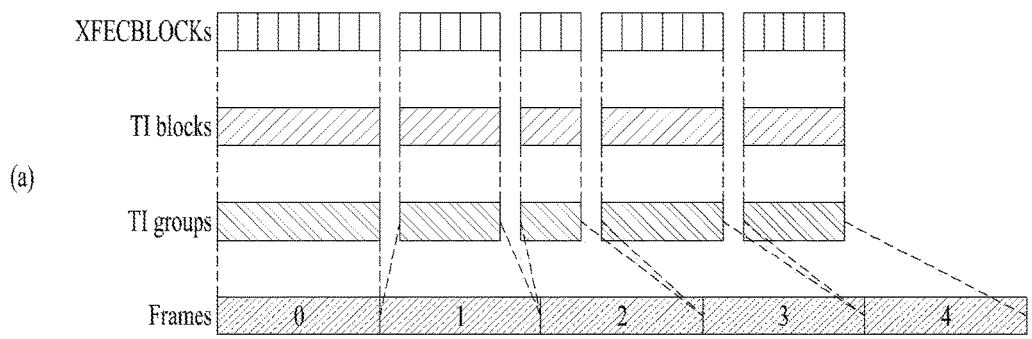
(a)
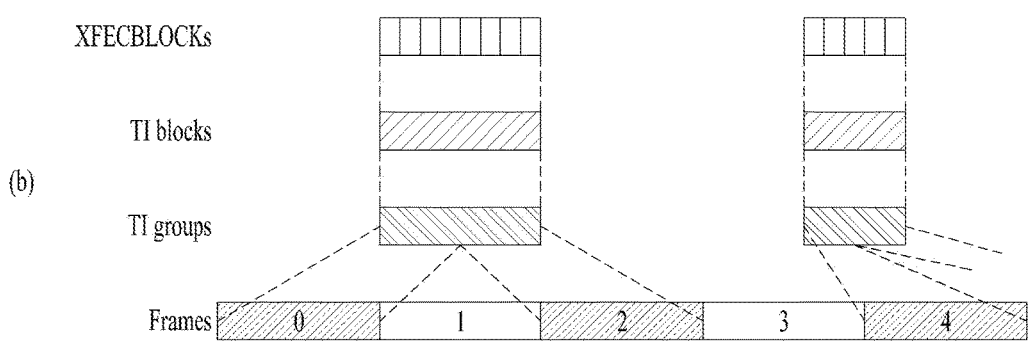
(b)
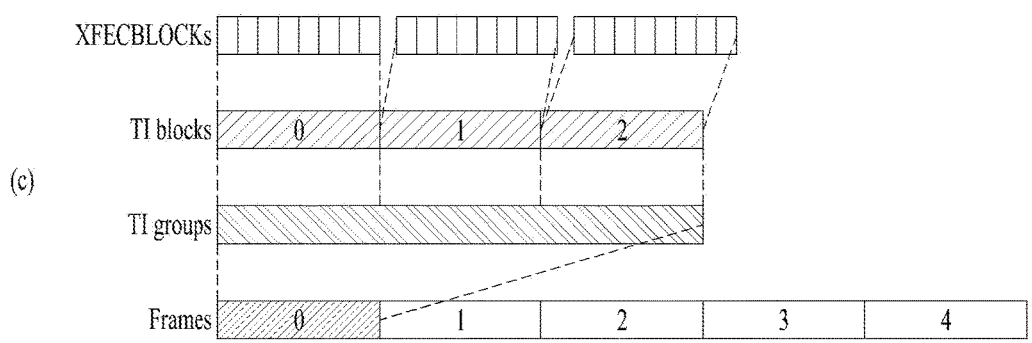
(c)

FIG. 21
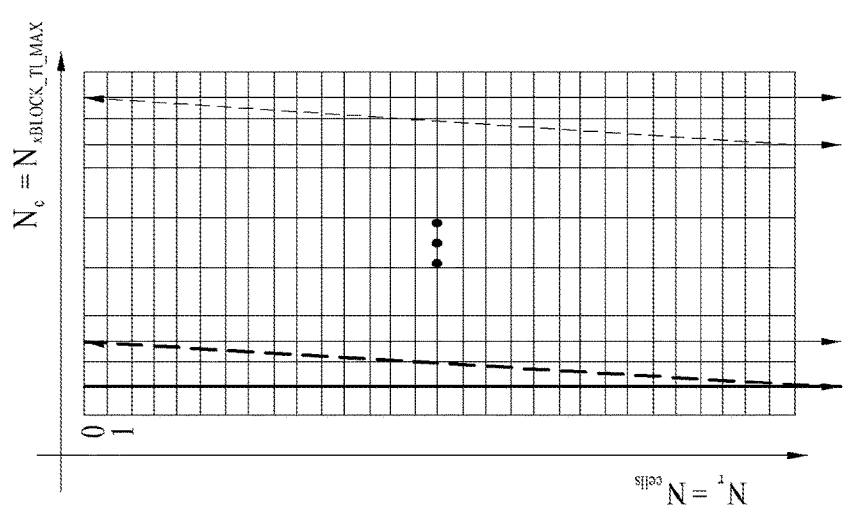
(b)
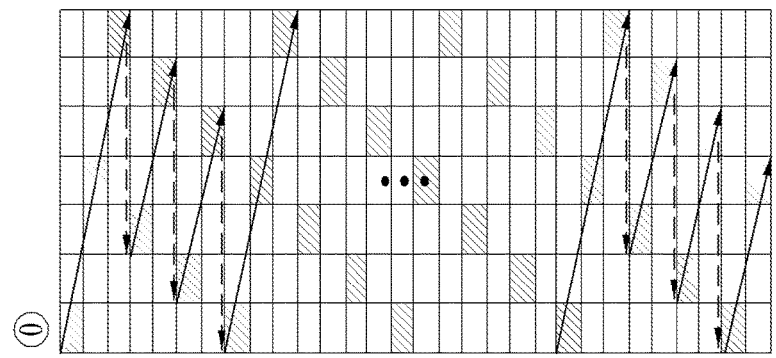
(a)

FIG. 27

| Signaling section header | Signaling (binary or XML formatted) |
|---|---|

| Syntax | No. Bits | Format |
|---|---|---|
| signaling_section_header{ | | |
|     table_id | 8 | TBD |
|     section_length | 12 | uimsbf |
|     reserved | 4 | '1111' |
|     table_id_extension{ | | |
|         protocol_version | 8 | uimsbf |
|         reserved | 8 | uimsbf |
|     } | | |
|     reserved | 2 | '11' |
|     version_number | 5 | uimsbf |
|     current_next_indicator | 1 | uimsbf |
|     section_number | 8 | uimsbf |
|     last_section_number | 8 | uimsbf |
| } | | |

Service mapping

| Syntax | No. of bits | Format |
|---|---|---|
| MPD_location (){ | | |
|     IP_version_flag | 1 | bslbf |
|     source_IP_address_flag | 1 | bslbf |
|     if(source_IP_address_flag) | | |
|         source_IP_address | 32 or 128 | uimsbf |
|     destination_IP_address | 32 or 128 | uimsbf |
|     destination_port_number | 16 | uimsbf |
|     dataPipe_id | 8 | uimsbf |
| } | | |

FIG. 29

MPD URL

Table_id=xx
MPD_id
MPD_URL

| Syntax | No. Bits | Format |
|---|---|---|
| MPD_URL_section () { | | |
|    table_id | 8 | uimsbf |
|    section_syntax_indicator | 1 | '0' |
|    private_indicator | 1 | '1' |
|    reserved | 2 | '11' |
|    private_section_length | 12 | uimsbf |
|    table_id_extension{ | | |
|      protocol_version | 8 | uimsbf |
|      sequence_number | 8 | uimsbf |
|    } | | |
|    reserved | 2 | '11' |
|    mpd_data_version | 5 | uimsbf |
|    current_next_indicator | 1 | '1' |
|    section_number | 8 | uimsbf |
|    last_section_number | 8 | uimsbf |
|    reserved | 4 | '1111' |
|    MPD_URL_length /* N */ | 12 | uimsbf |
|    MPD_URL_bytes () | 8*N | |
| } | | |

FIG. 30

MPD URL

```
Table_id=xx
MPD_id
MPD_URL
```

| Syntax | No. Bits | Format |
|---|---|---|
| MPD_URL_section () { | | |
|     table_id | 8 | uimsbf |
|     section_syntax_indicator | 1 | '0' |
|     private_indicator | 1 | '1' |
|     reserved | 2 | '11' |
|     private_section_length | 12 | uimsbf |
|     table_id_extension{ | | |
|         protocol_version | 8 | uimsbf |
|         sequence_number | 8 | uimsbf |
|     } | | |
|     reserved | 2 | '11' |
|     mpd_data_version | 5 | uimsbf |
|     current_next_indicator | 1 | '1' |
|     section_number | 8 | uimsbf |
|     last_section_number | 8 | uimsbf |
|     MPD_id_length /* M */ | 16 | uimsbf |
|     MPD_id_bytes () | 8*M | |
|     reserved | 4 | '1111' |
|     MPD_URL_length /* N */ | 12 | uimsbf |
|     MPD_URL_bytes () | 8*N | |
| } | | |

FIG. 31

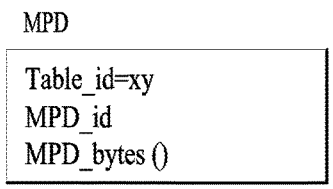

MPD

| Table_id=xy |
| MPD_id |
| MPD_bytes () |

| Syntax | No. Bits | Format |
|---|---|---|
| MPD_section () { | | |
|     table_id | 8 | uimsbf |
|     section_syntax_indicator | 1 | '0' |
|     private_indicator | 1 | '1' |
|     reserved | 2 | '11' |
|     private_section_length | 12 | uimsbf |
|     table_id_extension | 16 | uimsbf |
|     reserved | 2 | '11' |
|     mpd_data_version | 5 | uimsbf |
|     current_next_indicator | 1 | '1' |
|     section_number | 8 | uimsbf |
|     last_section_number | 8 | uimsbf |
|     reserved | 2 | '11' |
|     MPD_coding | 2 | uimsbf |
|     MPD_byte_length /* N */ | 12 | uimsbf |
|     MPD_bytes () | 8*N | |
| } | | |

FIG. 32

MPD
Table_id=xy
MPD_id
MPD_bytes ()

| Syntax | No. Bits | Format |
|---|---|---|
| MPD_section () { | | |
|     table_id | 8 | uimsbf |
|     section_syntax_indicator | 1 | '0' |
|     private_indicator | 1 | '1' |
|     reserved | 2 | '11' |
|     private_section_length | 12 | uimsbf |
|     table_id_extension{ | | |
|         protocol_version | 8 | uimsbf |
|         sequence_number | 8 | uimsbf |
|     } | | |
|     reserved | 2 | '11' |
|     mpd_data_version | 5 | uimsbf |
|     current_next_indicator | 1 | '1' |
|     section_number | 8 | uimsbf |
|     last_section_number | 8 | uimsbf |
|     reserved | 2 | '11' |
|     MPD_coding | 2 | uimsbf |
|     MPD_byte_length /* N */ | 12 | uimsbf |
|     MPD_bytes () | 8*N | |
| } | | |

FIG. 33

MPD

Table_id=xy
MPD_id
MPD_bytes ()

| Syntax | No. Bits | Format |
|---|---|---|
| MPD_section () { | | |
|     table_id | 8 | '0xFA' |
|     section_syntax_indicator | 1 | '0' |
|     private_indicator | 1 | '1' |
|     reserved | 2 | '11' |
|     private_section_length | 12 | uimsbf |
|     table_id_extension | 16 | uimsbf |
|     reserved | 2 | '11' |
|     mpd_data_version | 5 | uimsbf |
|     current_next_indicator | 1 | '1' |
|     section_number | 8 | uimsbf |
|     last_section_number | 8 | uimsbf |
|     MPD_id_length /* M */ | 16 | uimsbf |
|     MPD_id_bytes () | 8*M | |
|     reserved | 2 | '11' |
|     MPD_coding | 2 | uimsbf |
|     MPD_byte_length /* N */ | 12 | uimsbf |
|     MPD_bytes () | 8*N | |
| } | | |

BROADCAST SIGNAL TRANSMISSION APPARATUS, BROADCAST SIGNAL RECEPTION APPARATUS, BROADCAST SIGNAL TRANSMISSION METHOD, AND BROADCAST SIGNAL RECEPTION METHOD

CROSS REFERENCE TO RELATED APPLICATIONS

This application is the National Phase of PCT/KR2015/003571 filed on Apr. 9, 2015, which claims priority under 35 U.S.C. §119(e) to U.S. Provisional Application No. 61/977,593 filed on Apr. 9, 2014, all of which are hereby expressly incorporated by reference into the present application.

TECHNICAL FIELD

The present invention relates to an apparatus for transmitting broadcast signals, an apparatus for receiving broadcast signals and methods for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE OF THE INVENTION

Technical Problem

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast. And, it is necessary to receive signaling information for receiving a digital broadcast signal via various paths.

Technical Solution

To achieve these and other advantages and in accordance with the purpose of the present invention, as embodied and broadly described, according to one embodiment, a method of transmitting a broadcast signal can include the steps of encoding media data into media stream, generating signaling information signaling the media stream, multiplexing the encoded media stream and the signaling information, and transmitting the broadcast signal including the multiplexed media stream and signaling information.

Preferably, the signaling information can include address for accessing the media stream.

Preferably, the address for accessing the media stream may correspond to Hypertext Transfer Protocol Uniform Resource Locator, HTTP URL.

Preferably, the signaling information can include a Media Presentation Description, MPD.

Preferably, the signaling information can further include encoding method of the MPD.

Preferably, the signaling information can further include a field identifying the MPD.

Preferably, the signaling information can include URL information for downloading the MPD.

To further achieve these and other advantages and in accordance with the purpose of the present invention, according to a different embodiment, an apparatus of transmitting a broadcast signal can include an encoder to encode media data into media stream, a signaling generator to generate signaling information signaling the media stream, a multiplexer to multiplex the encoded media stream and the signaling information, and a transmitter to transmit the broadcast signal including the multiplexed media stream and signaling information.

Preferably, the signaling information can include address for accessing the media stream.

Preferably, the address for accessing the media stream may correspond to Hypertext Transfer Protocol Uniform Resource Locator, HTTP URL.

Preferably, the signaling information can include a Media Presentation Description, MPD.

Preferably, the signaling information can further include encoding method of the MPD.

Preferably, the signaling information can further include a field identifying the MPD. Preferably, the signaling information can include URL information for downloading the MPD.

To further achieve these and other advantages and in accordance with the purpose of the present invention, according to a different embodiment, a method of receiving a broadcast signal can include the steps of receiving the broadcast signal, wherein the broadcast signal includes multiplexed media stream and signaling information signaling the media stream, demultiplexing the broadcast signal and acquiring the signaling information, and acquiring the media stream by using the signaling information.

To further achieve these and other advantages and in accordance with the purpose of the present invention, according to a different embodiment, an apparatus of receiving a broadcast signal can include a receiver to receive the broadcast signal, wherein the broadcast signal includes multiplexed media stream and signaling information signaling the media stream, a demultiplexer to demultiplex the broadcast signal and acquire the signaling information, and a processor to acquire the media stream by using the signaling information.

Advantageous Effects

According to embodiments of the present invention, it is able to enhance transmission efficiency of a broadcast system.

According to embodiments of the present invention, it is able to provide a hybrid broadcasting service.

According to embodiments of the present invention, a broadcast reception apparatus is able to receive a media stream via broadband.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 illustrates a signaling hierarchy structure of the frame according to an embodiment of the present invention.

FIG. 11 illustrates preamble signaling data according to an embodiment of the present invention.

FIG. 12 illustrates PLS1 data according to an embodiment of the present invention.

FIG. 13 illustrates PLS2 data according to an embodiment of the present invention.

FIG. 20 illustrates a time interleaving according to an embodiment of the present invention.

FIG. 21 illustrates the basic operation of a twisted row-column block interleaver according to an embodiment of the present invention.

FIG. 27 illustrates a format of a signaling message and syntax of a signaling section header according to one embodiment of the present invention.

FIG. 29 illustrates a syntax structure of an MPD URL signaled in a next generation broadcast network according to one embodiment of the present invention.

FIG. 30 illustrates a syntax structure of an MPD URL signaled in a next generation broadcast network according to a different embodiment of the present invention.

FIG. 31 illustrates a syntax structure of an MPD signaled in a next generation broadcast network according to one embodiment of the present invention.

FIG. 32 illustrates a syntax structure of an MPD signaled in a next generation broadcast network according to a different embodiment of the present invention.

FIG. 33 illustrates a syntax structure of an MPD signaled in a next generation broadcast network according to one embodiment of the present invention.

BEST MODE

Figure 1:
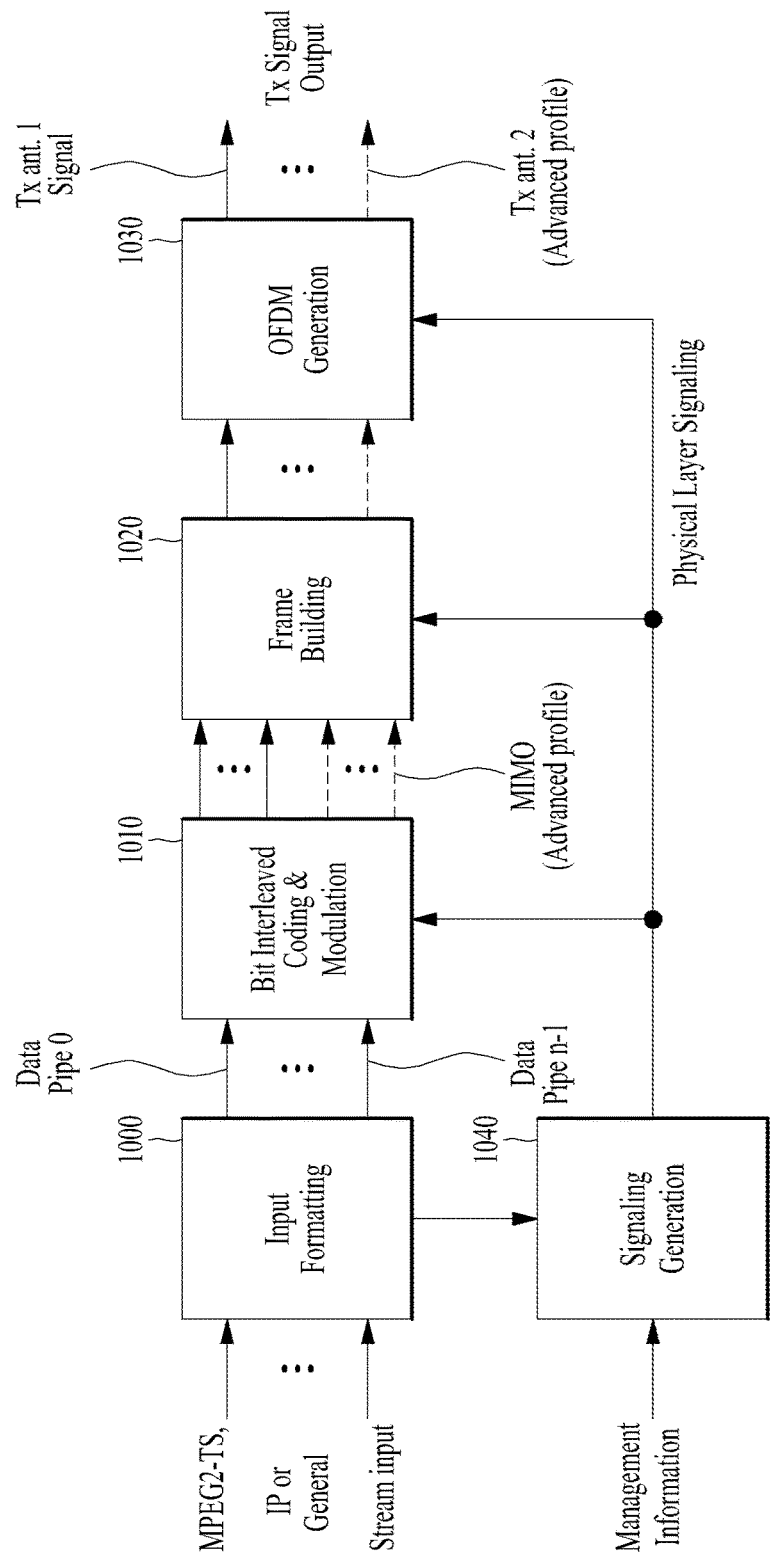
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

An object of the present invention is to transmit and receive a metadata for using a streaming service in a method of transmitting a broadcast signal and an apparatus therefor.

Another object of the present invention is to transmit and receive an address capable of obtaining a meta data for using a streaming service.

Another object of the present invention is to transmit and receive a broadcast signal in a manner of including a metadata for using a streaming service in the broadcast signal.

The other object of the present invention is to provide a streaming service preferred by a user using a received metadata or an address of the meta data.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas. The present invention may defines three physical layer (PL) profiles (base, handheld and advanced profiles), each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

[Table 1]
LDPC codeword length 16K, 64K bits
Constellation size 4~10 bpcu (bits per channel use)
Time de-interleaving memory size ≤$2^{19}$ data cells
Pilot patterns Pilot pattern for fixed reception
FFT size 16K, 32K points 2. Handheld Profile The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

[Table 2]
LDPC codeword length 16K bits
Constellation size 2~8 bpcu
Time de-interleaving memory size ≤$2^{18}$ data cells
Pilot patterns Pilot patterns for mobile and indoor reception
FFT size 8K, 16K points 3. Advanced Profile The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

[Table 3]
LDPC codeword length 16K, 64K bits
Constellation size 8~12 bpcu
Time de-interleaving memory size ≤$2^{19}$ data cells
Pilot patterns Pilot pattern for fixed reception
FFT size 16K, 32K points In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
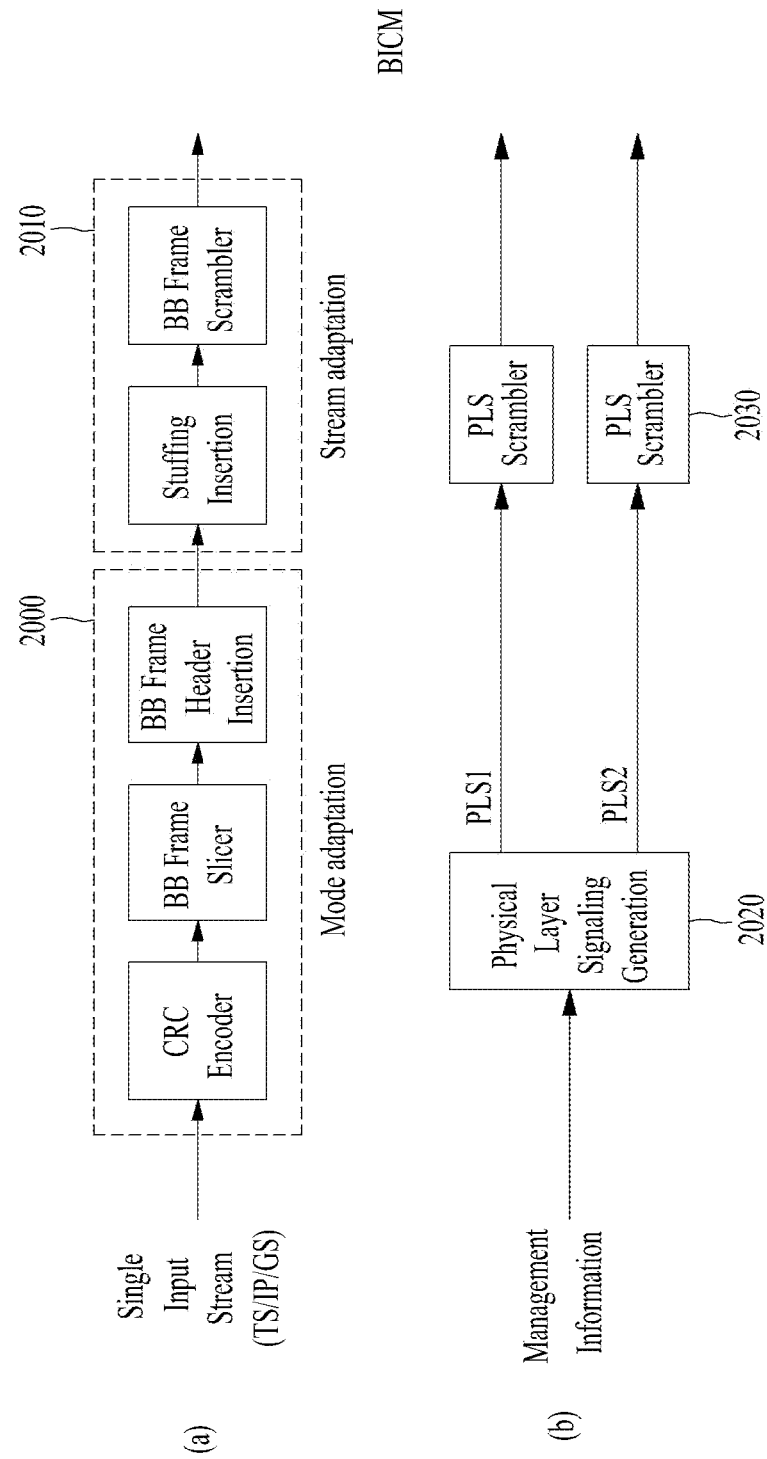
FIG. 2 illustrates an input formatting block according to one embodiment of the present invention.
Figure 3:
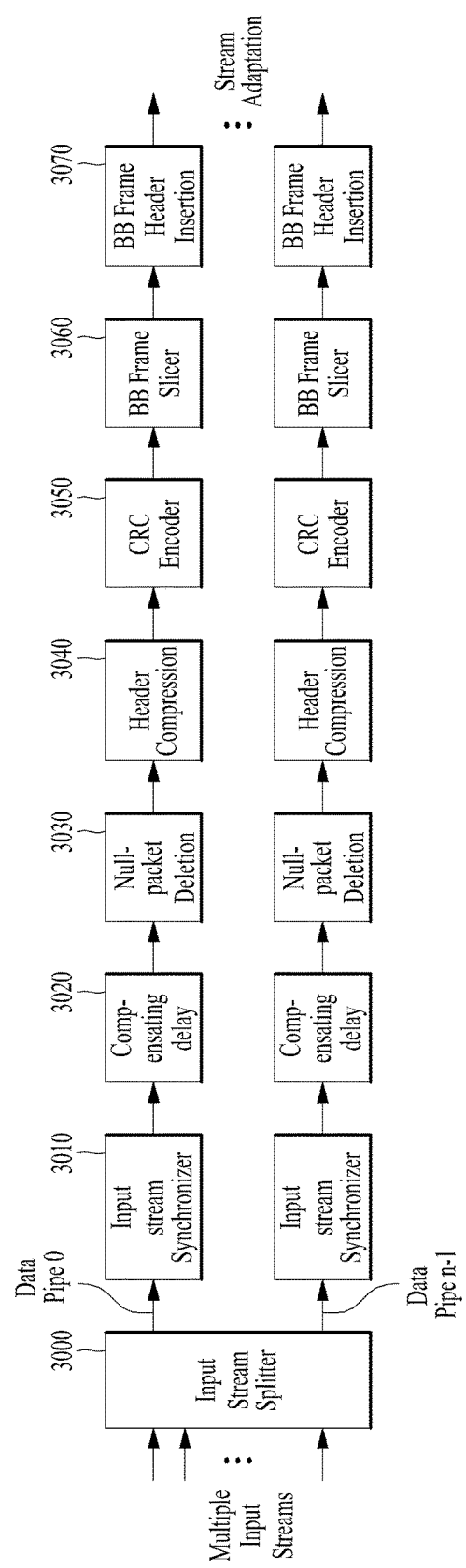
FIG. 3 illustrates an input formatting block according to another embodiment of the present invention.
Figure 4:
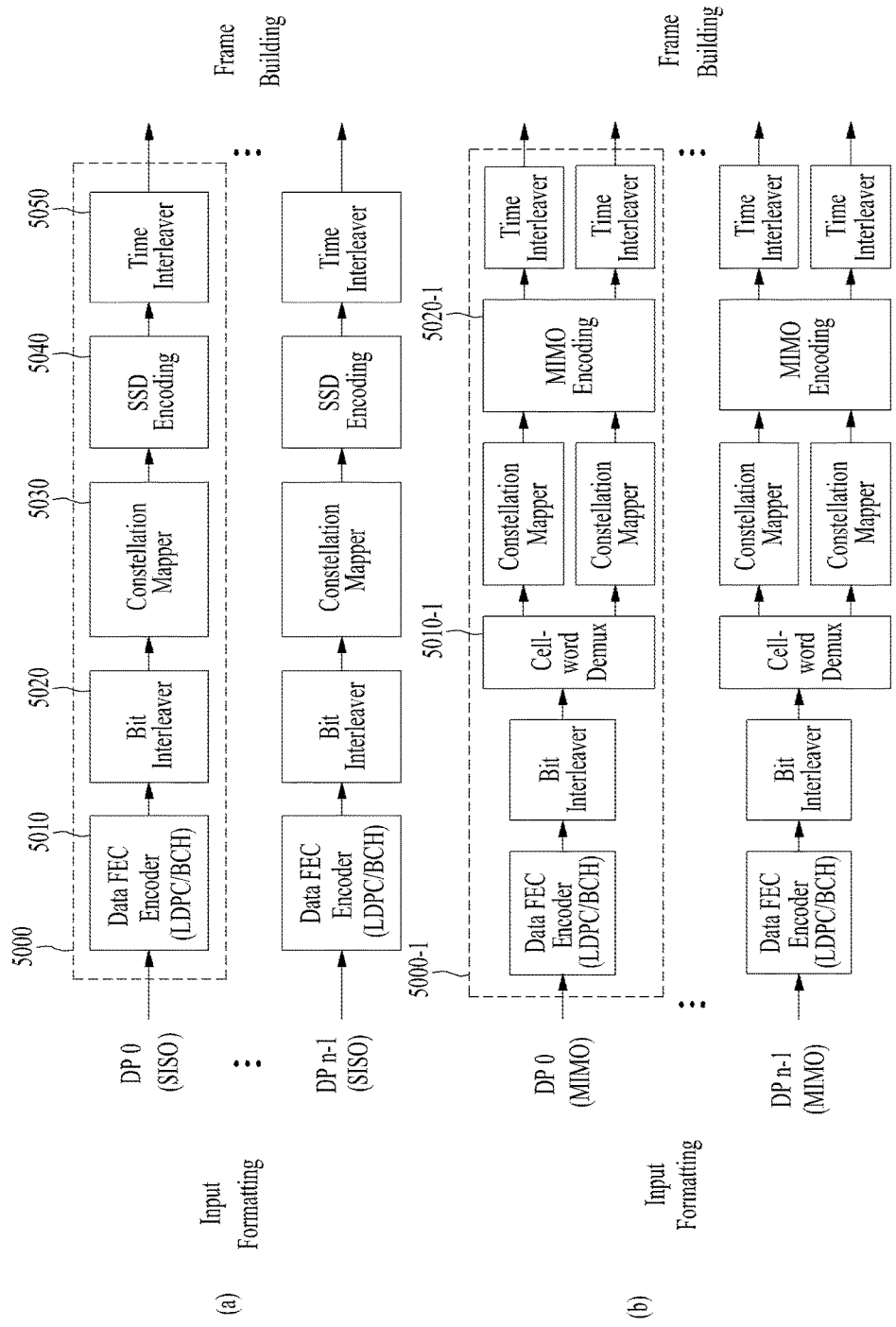
FIG. 4 illustrates a BICM block according to an embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signalled within IP packet headers. The system supports both IPv4 and IPv6 for the IP stream. GS may be composed of variable length packets or constant length packets, signalled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler. The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream. The above-described blocks may be omitted or replaced by blocks having similar or identical functions.

FIG. 4 illustrates a BICM block according to an embodiment of the present invention.

The BICM block illustrated in FIG. 4 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_j$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 5:
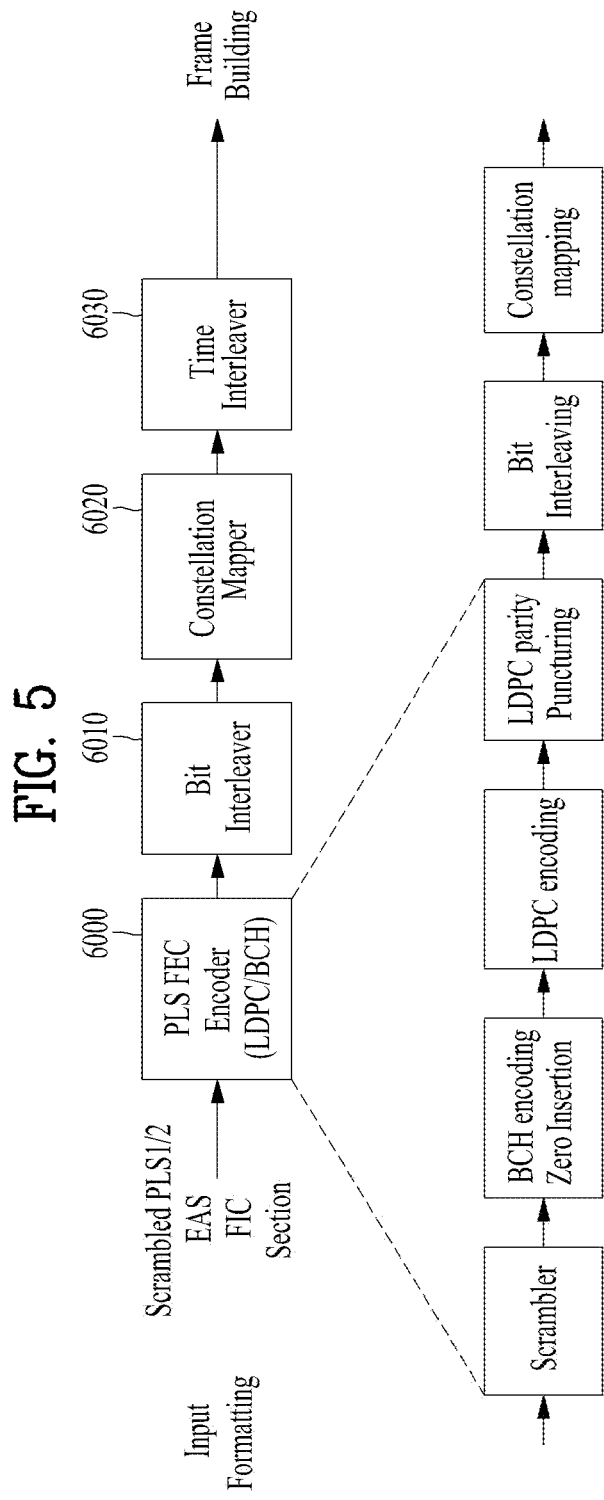
FIG. 5 illustrates a BICM block according to another embodiment of the present invention.

FIG. 5 illustrates a BICM block according to another embodiment of the present invention.

The BICM block illustrated in FIG. 5 corresponds to an embodiment of the BICM block 1010 described with reference to FIG. 1.

FIG. 5 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 5, the BICM block for protection of PLS, EAC and FIC can include a PLS FEC encoder 6000, a bit interleaver 6010, and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math FIG. 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

Figure 6:
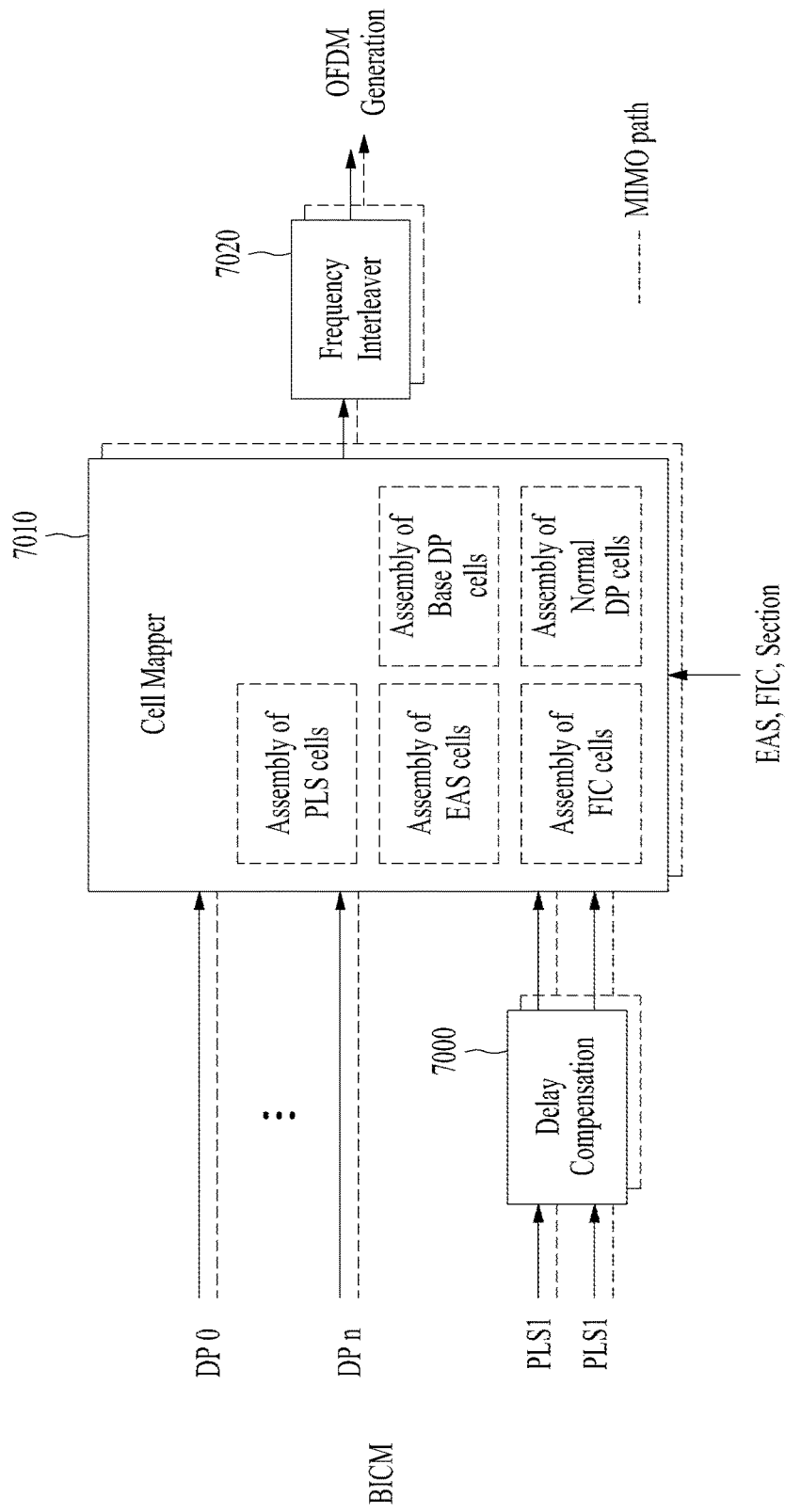
FIG. 6 illustrates a frame building block according to one embodiment of the present invention.

FIG. 6 illustrates a frame building block according to one embodiment of the present invention.

The frame building block illustrated in FIG. 6 corresponds to an embodiment of the frame building block 1020 described with reference to FIG. 1.

Referring to FIG. 6, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signalled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI(program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 7:
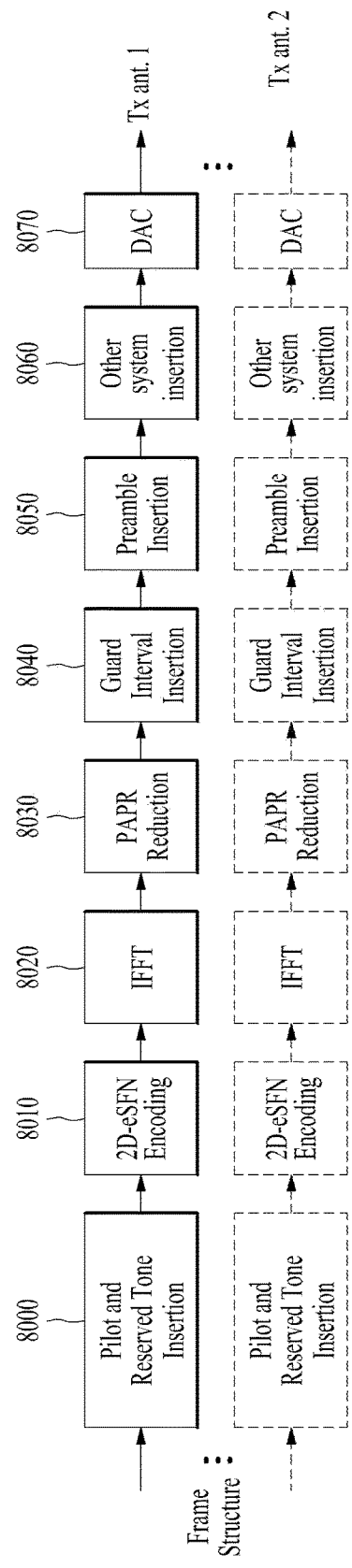
FIG. 7 illustrates an OFMD generation block according to an embodiment of the present invention.

FIG. 7 illustrates an OFMD generation block according to an embodiment of the present invention.

The OFMD generation block illustrated in FIG. 7 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Figure 8:
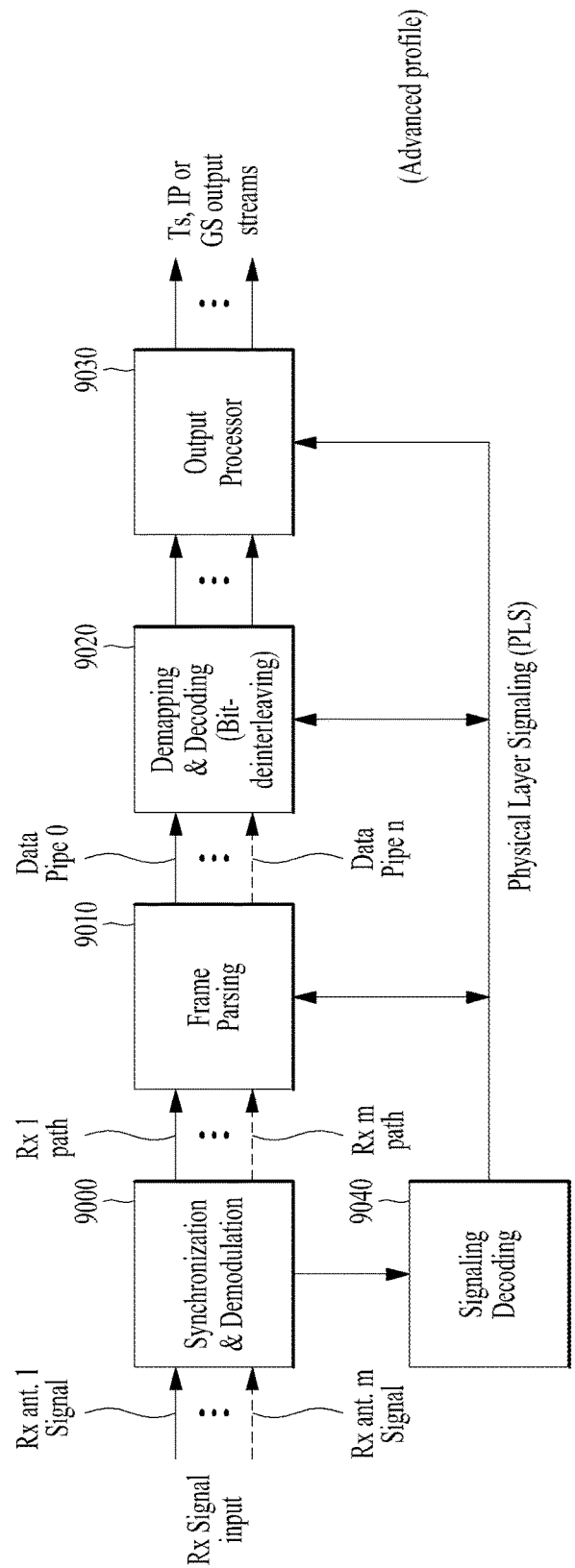
FIG. 8 illustrates a structure of an apparatus for receiving broadcast signals for future broadcast services according to an embodiment of the present invention.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

Figure 9:
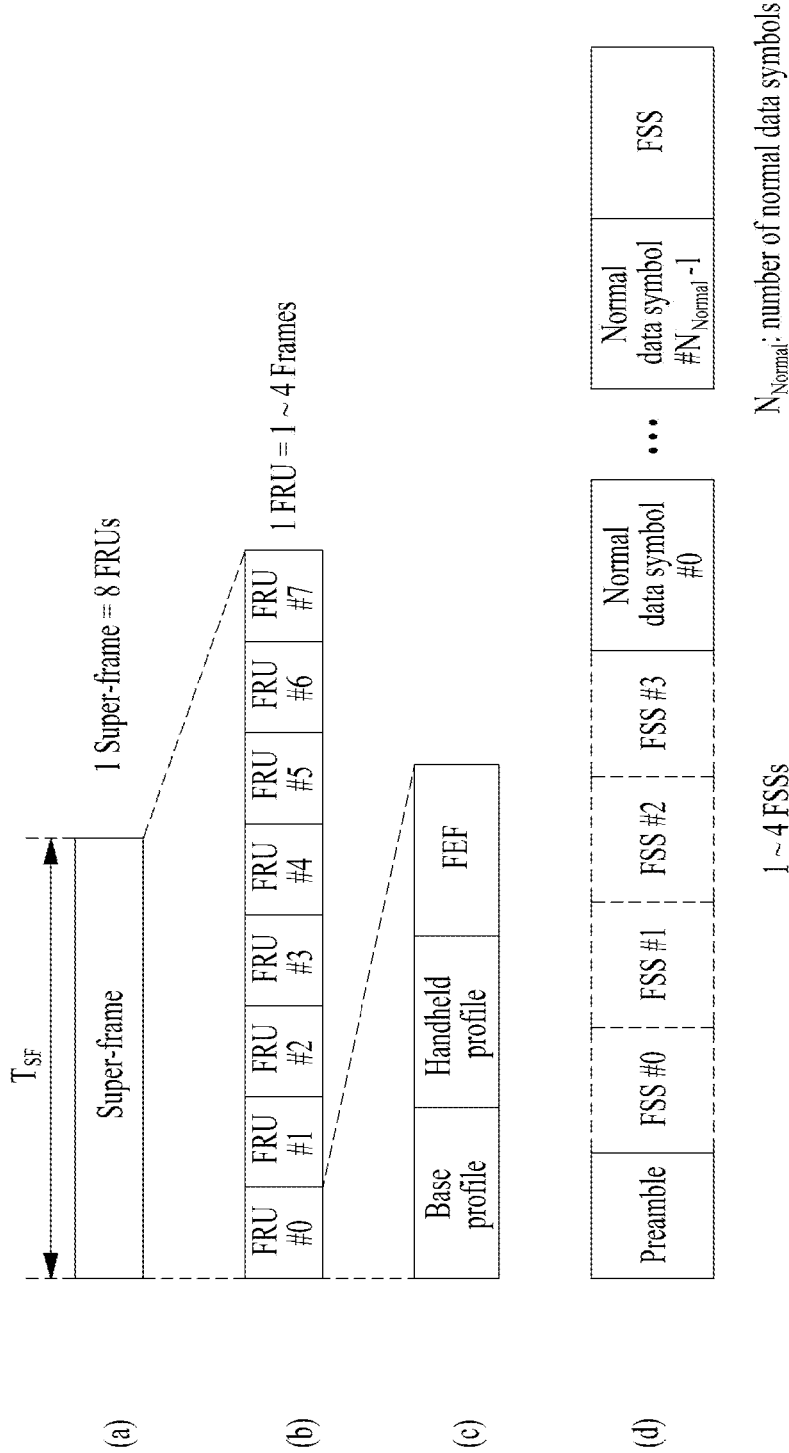
FIG. 9 illustrates a frame structure according to an embodiment of the present invention.

FIG. 9 illustrates a frame structure according to an embodiment of the present invention.

FIG. 9 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 10 illustrates a signaling hierarchy structure of the frame according to an embodiment of the present invention.

FIG. 10 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 11 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 12 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signalled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signalled within the FRU. If NUM_FRAME_FRU is less than 4, the unused fields are filled with zeros.

FRU_PHY_PROFILE: This 3-bit field indicates the PHY profile type of the $(i+1)^{th}$ (i is the loop index) frame of the associated FRU. This field uses the same signaling format as shown in the table 8.

FRU_FRAME_LENGTH: This 2-bit field indicates the length of the $(i+1)^{th}$ frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the $(i+1)^{th}$ frame of the associated FRU. FRU_GI_FRACTION is signalled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signalled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXTREP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 13 illustrates PLS2 data according to an embodiment of the present invention.

FIG. 13 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signalled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signalled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signalled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signalled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signalled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_1$, the number of the frames to which each TI group is mapped, and there is one TI-block per TI group ($N_{TI}=1$). The allowed $P_I$ values with 2-bit field are defined in the below table 18.

If the DP_TI_TYPE is set to the value '0', this field indicates the number of TI-blocks $N_{TI}$ per TI group, and there is one TI group per frame ($P_I=1$). The allowed $P_I$ values with 2-bit field are defined in the below table 18.

TABLE 18

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signalled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signalled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP It is signalled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
| --- | --- | --- | --- |
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to T.

DP_TI_BYPASS: This 1-bit field determines the availability of time interleaver. If time interleaving is not used for a DP, it is set to F. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_CRC MODE: This 2-bit field indicates whether CRC encoding is used in the Input Formatting block. The CRC mode is signalled according to the below table 22.

TABLE 22

| Value | CRC mode |
| --- | --- |
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
| --- | --- |
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signalled according to the below table 24 If DP_PAYLOAD_TYPE is not TS ('00'), ISSY_MODE is set to the value '00'.

TABLE 24

| Value | ISSY mode |
| --- | --- |
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signalled according to the below table 25.

TABLE 25

| Value | Header compression mode |
| --- | --- |
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signalled according to the below table 26.

TABLE 26

| Value | Header compression mode |
| --- | --- |
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 14, 15:
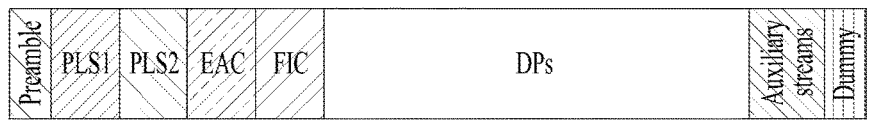
FIG. 14 illustrates PLS2 data according to another embodiment of the present invention.
FIG. 15 illustrates a logical structure of a frame according to an embodiment of the present invention.

FIG. 14 illustrates PLS2 data according to another embodiment of the present invention.

FIG. 14 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signalled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
| --- | --- | --- |
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 15 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 16:
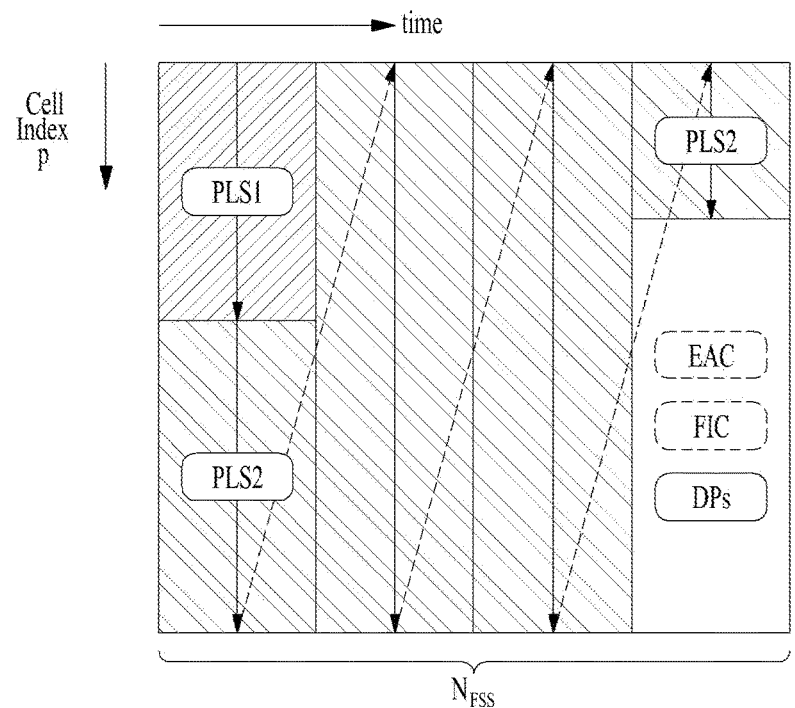
FIG. 16 illustrates PLS mapping according to an embodiment of the present invention.

FIG. 16 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 16. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 17:
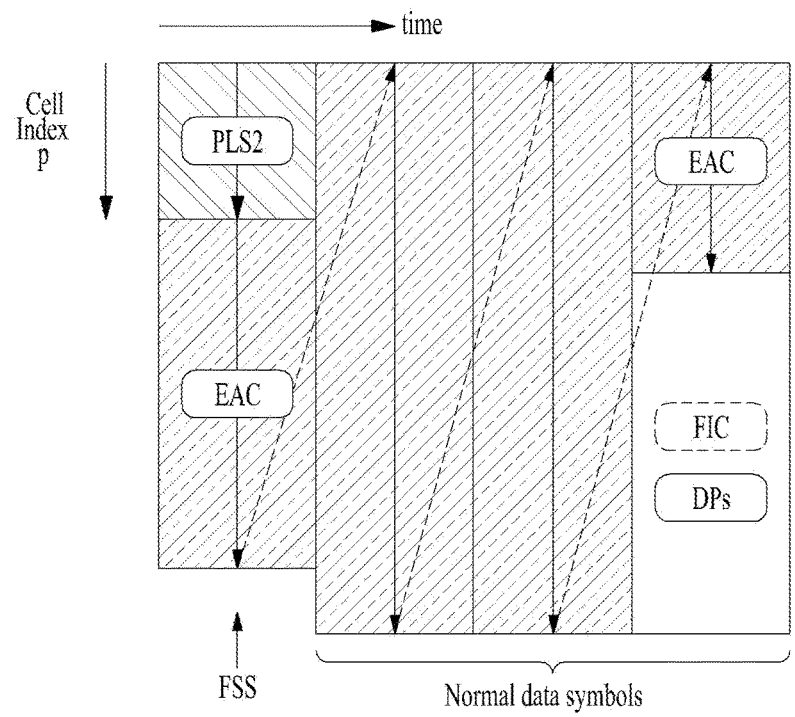
FIG. 17 illustrates EAC mapping according to an embodiment of the present invention.

FIG. 17 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 17. Depending on the EAS message size, EAC cells may occupy a few symbols, as shown in FIG. 17.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 18:
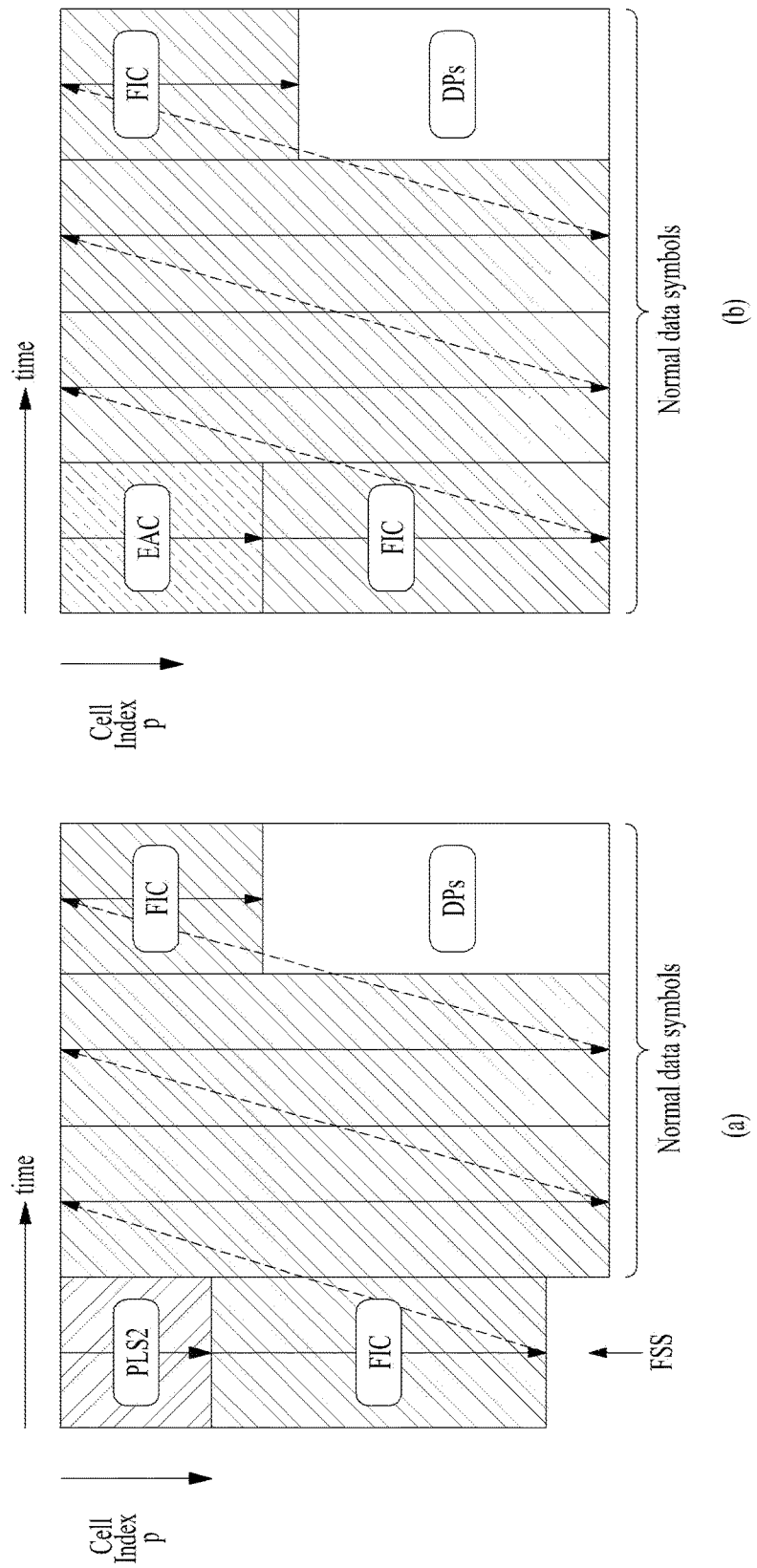
FIG. 18 illustrates FIC mapping according to an embodiment of the present invention.

FIG. 18 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signalled by the FIC_FLAG parameter in the static part of the PLS2. If FIC is used, FIC_FLAG is set to '1' and the signaling field for FIC is defined in the static part of PLS2. Signalled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 19:
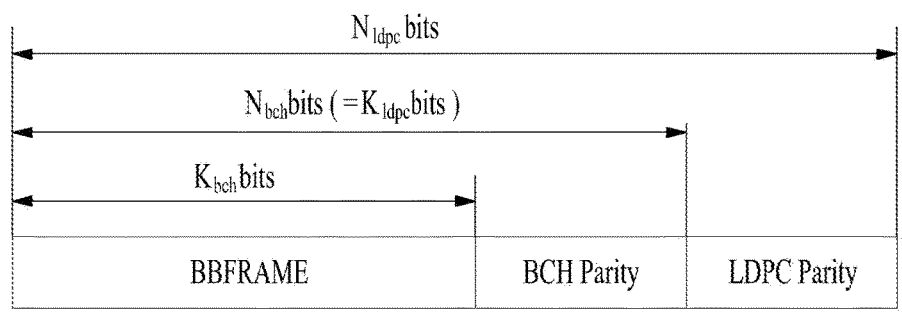
FIG. 19 illustrates an FEC structure according to an embodiment of the present invention.

FIG. 19 illustrates an FEC structure according to an embodiment of the present invention.

FIG. 19 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 19.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 |  | 25920 | 25728 |  |  |
| 7/15 |  | 30240 | 30048 |  |  |
| 8/15 |  | 34560 | 34368 |  |  |
| 9/15 |  | 38880 | 38688 |  |  |
| 10/15 |  | 43200 | 43008 |  |  |
| 11/15 |  | 47520 | 47328 |  |  |
| 12/15 |  | 51840 | 51648 |  |  |
| 13/15 |  | 56160 | 55968 |  |  |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 |  | 6480 | 6312 |  |  |
| 7/15 |  | 7560 | 7392 |  |  |
| 8/15 |  | 8640 | 8472 |  |  |
| 9/15 |  | 9720 | 9552 |  |  |
| 10/15 |  | 10800 | 10632 |  |  |
| 11/15 |  | 11880 | 11712 |  |  |
| 12/15 |  | 12960 | 12792 |  |  |
| 13/15 |  | 14040 | 13872 |  |  |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Math figure.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math FIG. 2]

The parameters for long FECBLOCK and short FECBLOCK are given in the above table 28 and 29, respectively.

The detailed procedure to calculate $N_{ldpc} - K_{ldpc}$ parity bits for long FECBLOCK, is as follows:

1) Initialize the parity bits, $$p_0 = p_1 = p_2 = \ldots = p_{N_{ldpc}-K_{ldpc}-1} = 0$$ [Math FIG. 3]

2) Accumulate the first information bit—$i_0$, at parity bit addresses specified in the first row of an addresses of parity check matrix. The details of addresses of parity check matrix will be described later. For example, for rate 13/15:

$$p_{983} = p_{983} \oplus i_0 \quad p_{2815} = p_{2815} \oplus i_0$$

$$p_{4837} = p_{4837} \oplus i_0 \quad p_{4989} = p_{4989} \oplus i_0$$

$$p_{6138} = p_{6138} \oplus i_0 \quad p_{6458} = p_{6458} \oplus i_0$$

$$p_{6921} = p_{6921} \oplus i_0 \quad p_{6974} = p_{6974} \oplus i_0$$

$$p_{7572} = p_{7572} \oplus i_0 \quad p_{8260} = p_{8260} \oplus i_0$$

$$p_{8496} = p_{8496} \oplus i_0$$ [Math FIG. 4]

3) For the next 359 information bits, $i_s$, s=1, 2, . . . , 359 accumulate $i_s$ at parity bit addresses using following Math figure.

$$\{x + (s \bmod 360) \times Q_{ldpc}\} \bmod (N_{ldpc} - K_{ldpc})$$ [Math FIG. 5]

where x denotes the address of the parity bit accumulator corresponding to the first bit $i_0$, and $Q_{ldpc}$ is a code rate dependent constant specified in the addresses of parity check matrix. Continuing with the example, $Q_{ldpc}=24$ for rate 13/15, so for information bit $i_1$, the following operations are performed:

$$p_{1007} = p_{1007} \oplus i_1 \quad p_{2839} = p_{2839} \oplus i_1$$

$$p_{4861} = p_{4861} \oplus i_1 \quad p_{5013} = p_{5013} \oplus i_1$$

$$p_{6162} = p_{6162} \oplus i_1 \quad p_{6482} = p_{6452} \oplus i_1$$

$$p_{6945} = p_{6945} \oplus i_1 \quad p_{6998} = p_{6998} \oplus i_1$$

$$p_{7596} = p_{7596} \oplus i_1 \quad p_{8284} = p_{8284} \oplus i_1$$

$$p_{8520} = p_{8520} \oplus i_1$$ [Math FIG. 6]

4) For the 361st information bit $i_{360}$, the addresses of the parity bit accumulators are given in the second row of the addresses of parity check matrix. In a similar manner the addresses of the parity bit accumulators for the following 359 information bits $i_s$, s=361, 362, . . . , 719 are obtained using the Math FIG. 5, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1,2, \ldots, N_{ldpc} - K_{ldpc} - 1$$ [Math FIG. 7]

where final content of $p_i$, i=0, 1, . . . , $N_{ldpc} - K_{ldpc} - 1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |

TABLE 30-continued

| Code Rate | $Q_{ldpc}$ |
|---|---|
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 20 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks ($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 32.

TABLE 32

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1' ($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

FIG. 21 illustrates the basic operation of a twisted row-column block interleaver according to an embodiment of the present invention.

FIG. 21 (a) shows a writing operation in the time interleaver and (b) shows a reading operation in the time interleaver. The first XFECBLOCK is written column-wise into the first column of the TI memory, and the second XFEC-BLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, ..., $N_r N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$, as follows expression.

$$\text{GENERATE}(R_{n,s,i}, C_{n,s,i}) = \quad \text{[Math FIG. 8]}$$

$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows expression.

[Math FIG. 9]

$$\begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases}$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

Figure 22:
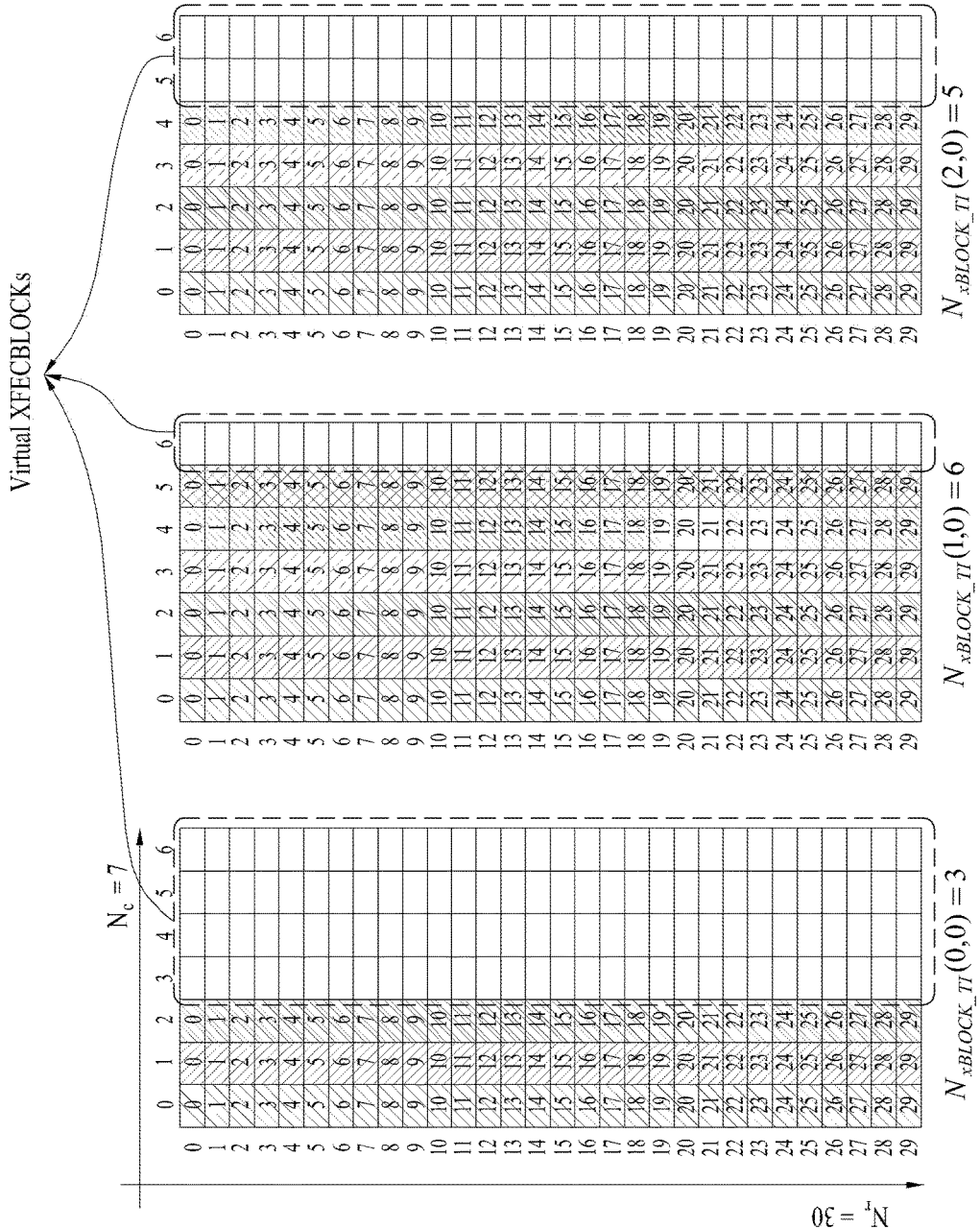
FIG. 22 illustrates an operation of a twisted row-column block interleaver according to another embodiment of the present invention.

FIG. 22 illustrates an operation of a twisted row-column block interleaver according to another embodiment of the present invention.

More specifically, FIG. 22 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

[Math FIG. 10]
```
p = 0;
for i = 0; i < N_cells N'_xBLOCK_TI_MAX; i = i + 1
{GENERATE (R_{n,s,i}, C_{n,s,i});
V_i = N_r C_{n,s,j} + R_{n,s,j}
    if V_i < N_cells N_xBLOCK_TI (n,s)
    {
        Z_{n,s,p} = V_i; p = p + 1;
    }
}
```

The number of TI groups is set to 3. The option of time interleaver is signaled in the PLS2-STAT data by DP_TI_TYPE='0', DP_FRAME_INTERVAL='1', and DP_TI_LENGTH='1', $I_{JUMP}=1$, and $P_I=1$. The number of XFECBLOCKs, each of which has $N_{cells}=30$ cells, per TI group is signaled in the PLS2-DYN data by $N_{xBLOCK\_TI}(0,0)=3$, $N_{xBLOCK\_TI}(1,0)=6$, and $N_{xBLOCK\_TI}(2,0)=5$, respectively. The maximum number of XFECBLOCK is signaled in the PLS2-STAT data by $N_{xBLOCK\_Group\_MAX}$, which leads to $\lfloor N_{xBLOCK\_Group\_MAX}/N_{TI} \rfloor = N_{xBLOCK\_TI\_MAX} = 6$.

Figure 23:
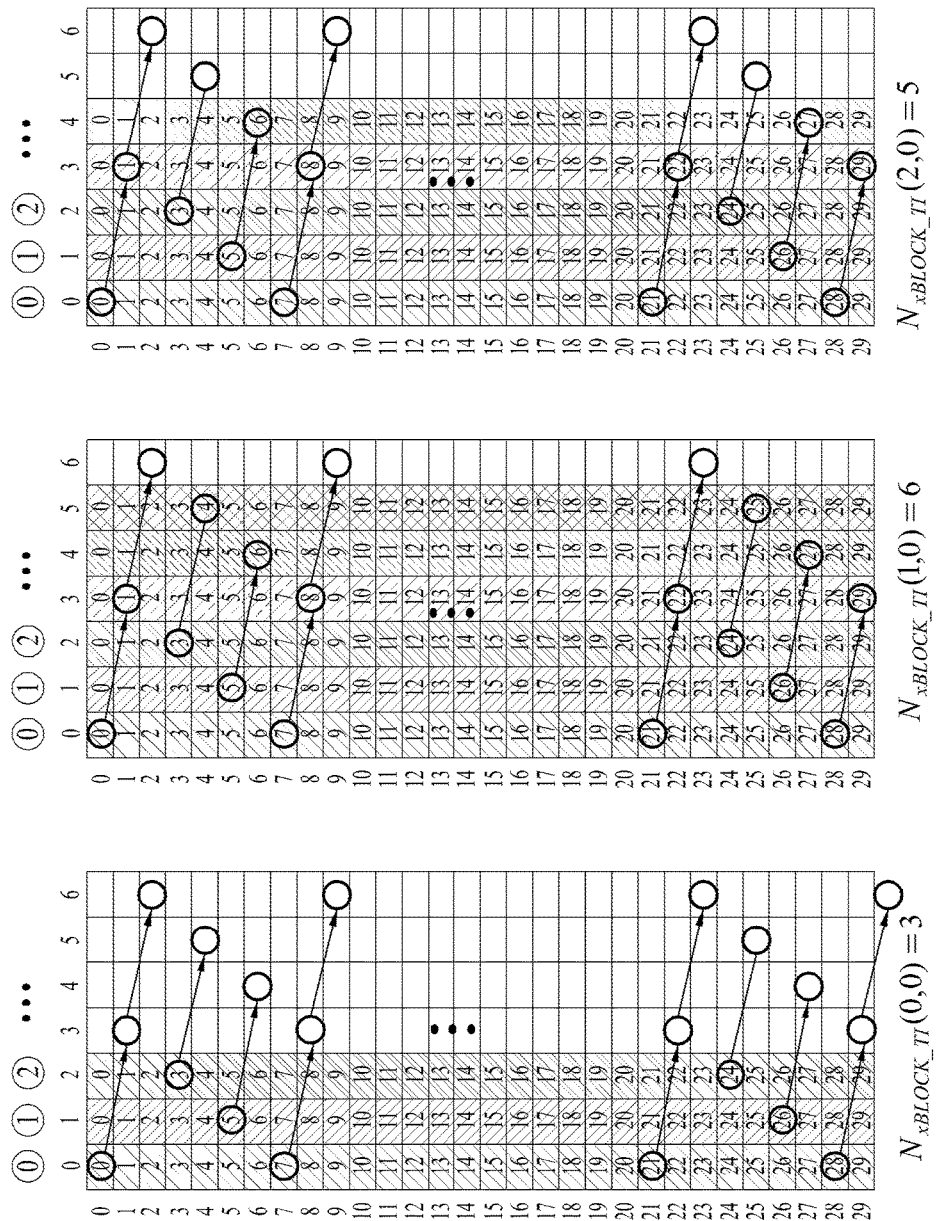
FIG. 23 illustrates a diagonal-wise reading pattern of a twisted row-column block interleaver according to an embodiment of the present invention.

FIG. 23 illustrates a diagonal-wise reading pattern of a twisted row-column block interleaver according to an embodiment of the present invention.

More specifically FIG. 23 shows a diagonal-wise reading pattern from each interleaving array with parameters of $N'_{xBLOCK\_TI\_MAX}=7$ and $S_{shift}=(7-1)/2=3$. Note that in the reading process shown as pseudocode above, if $V_i \geq N_{cells} N_{xBLOCK\_TI}(n,s)$, the value of $V_i$ is skipped and the next calculated value of $V_i$ is used.

Figure 24:
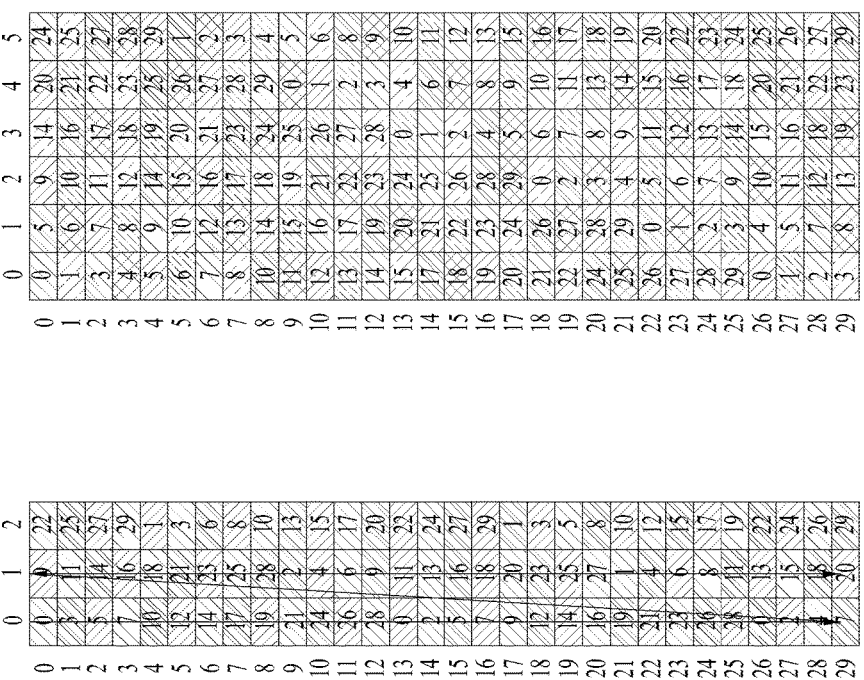
FIG. 24 illustrates interleaved XFECBLOCKs from each interleaving array according to an embodiment of the present invention.

FIG. 24 illustrates interleaved XFECBLOCKs from each interleaving array according to an embodiment of the present invention.

FIG. 24 illustrates the interleaved XFECBLOCKs from each interleaving array with parameters of $N_{xBLOCK\_TI\_MAX}=7$ and $S_{shift}=3$.

Figure 25:
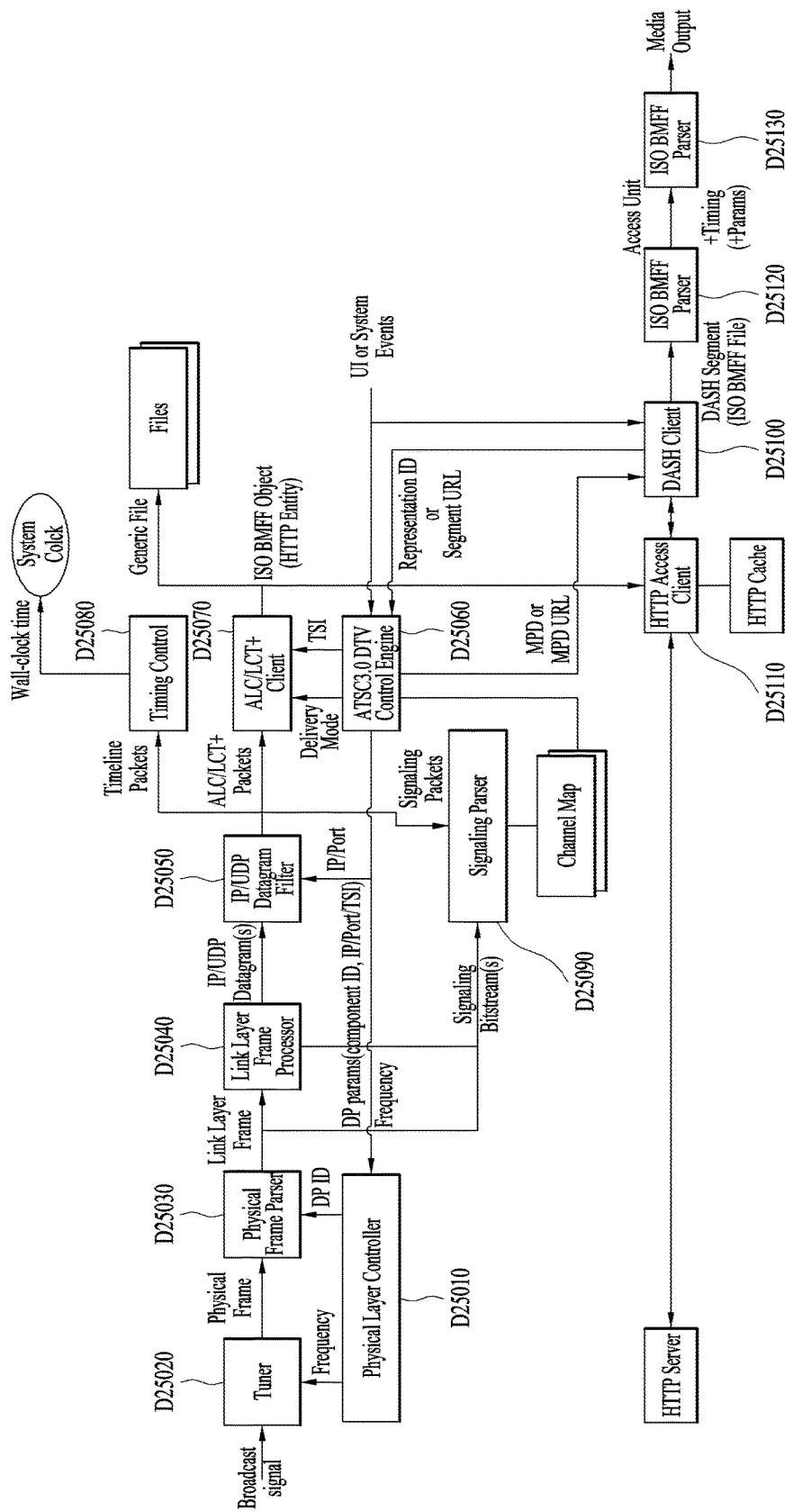
FIG. 25 is a block diagram for a hybrid broadcasting receiver according to one embodiment of the present invention.

FIG. 25 is a block diagram for a hybrid broadcasting receiver according to one embodiment of the present invention.

A hybrid broadcast receiver can receive a hybrid broadcasting service in a manner of associating terrestrial broadcasting with broadband in a DTV service of a next generation broadcast system. The hybrid broadcast receiver receives audio/video (A/V) contents broadcasted by the terrestrial broadcasting and may be able to receive enhancement data associated with the AN contents or a part of the AN contents in real time via broadband. In the present specification, the broadcast A/V contents may be referred to as media contents.

The hybrid broadcast receiver can include a physical layer controller D30010, a tuner D30020, a physical frame parser D30030, a link layer frame parser D30040, an IP/UDP datagram filter D30050, an ATSC 3.0 digital television (DTV) control engine D30060, an ALC/LCT+ client D30070, a timing controller D30080, a signaling parser D30090, a dynamic adaptive streaming over HTTP (DASH) client D30100, an HTTP access client D30110, an ISO base media file format (BMFF) parser D30120, and/or a media decoder D30130.

The physical layer controller D30010 can control operations of the tuner D30020, the physical frame parser D30030 and the like using radio frequency (RF) information of a terrestrial broadcasting channel intended to be received by the hybrid broadcast receiver.

The tuner D30020 receives and processes a broadcasting-related signal via a terrestrial broadcasting channel and may be able to covert the signal into an appropriate form. For example, the tuner D30020 can convert a received terrestrial broadcast signal into a physical frame.

The physical frame parser D30030 parses a received physical frame and may be then able to obtain a link layer frame via processing related to the physical frame.

The link layer parser D30040 may obtain link layer signaling from a link layer frame or perform relevant calculation to obtain IP/UDP datagram. The link layer parser D30040 can output at least one or more IP/UDP datagrams.

The IP/IDP datagram filter D30050 can filter a specific IP/UDP datagram from at least one or more received IP/UDP datagrams. In particular, the IP/UDP datagram filter D30050 can selectively filter an IP/UDP datagram selected by the ATSC 3.0 digital television control engine D30060 from among at least one or more IP/UDP datagrams outputted by the link layer parser D30040. The IP/UDP datagram filter D30050 can output an application layer transmission protocol packet such as ALC/LCT+ and the like.

The ATSC 3.0 digital television control engine D30060 may be in charge of an interface between modules included in each hybrid broadcasting receiver. And, the ATSC 3.0 digital television control engine D30060 delivers a parameter and the like required by a module to the module and may be able to control an operation of the module via the parameter. In the present invention, the ATSC 3.0 digital television control engine D30060 can deliver a media presentation description (MPD) and/or an MPD URL to the DASH client D30100. And, the ATSC 3.0 digital television control engine D30060 can deliver a delivery mode and/or a transport session identifier (TSI) to the ALC/LCT+ client D30070. In this case, the TSI can indicate an identifier of a session for transmitting a transport packet including a signaling message such as an MPD or an MPD URL-related signaling, e.g., an identifier of an ALC/LCT+ session corresponding to an application layer transmission protocol or an identifier of a FLUTE session. And, a transmission session identifier may correspond to an asset id of an MMT.

The ALC/LCT+ client D30070 processes an application layer transmission protocol packet such as ALC/LCT+ and the like, collects and processes a plurality of packets and may be then able to generate one or more ISO base media file format (ISOBMFF) objects. The application layer transmission protocol packet can include an ALC/LCT packet, an ALC/LCT+ packet, a ROUTE packet, and/or an MMT packet.

The timing controller D30080 processes a packet including system time information and may be able control a system clock according to the packet.

The signaling parser D30090 obtains and parses DTV broadcasting service-related signaling and may be able to generate and manage a channel map based on the parsed signaling. In the present invention, the signaling parser can parse an MPD extended from signaling information or MPD-related information and the like.

The DASH client D30100 can perform calculation related to real-time streaming or adaptive streaming. The DASH client D30100 can receive DASH contents from an HTTP server via the HTTP access client D30110. The DASH client D30100 can output an ISO base media file format object by processing a received DASH segment and the like. In the present invention, the DASH client D30100 can deliver total representation ID (fully qualified representation ID) or a segment URL to the ATSC 3.0 digital television control engine D30060. In this case, for example, the total representation ID may correspond to an ID of which an MPD URL, period@id and representation@id are combined with each other. The DASH client D300100 can receive an MPD or an MPD URL from the ATSC 3.0 digital television control engine D30060. The DASH client D300100 can receive a preferred media stream or a DAS segment from an HTTP server using the received MPD or the MPD URL. In the present specification, the DASH client D30100 may be referred to as a processor.

The HTTP access client D30110 asks an HTTP server to transmit specific information and may be able to receive a response from the HTTP server. In this case, the HTTP server processes a request received from the HTTP access client and may be able to provide a response to the HTTP access client in response to the request.

The ISO BMFF parser D30120 can extract audio/video data from an ISO base media file format object.

The media decoder D30130 decodes received audio and/or video data and may be then able to perform processing for making a presentation of the decoded audio/video data.

In order for the hybrid broadcast receiver according to the present invention to provide a hybrid broadcasting service by associating a terrestrial broadcasting network with broadband, it is necessary to extend or modify an MPD. The aforementioned terrestrial broadcasting system can transmit an extended or a modified MPD and the hybrid broadcast receiver can receive contents via broadcasting or broadband using the extended or the modified MPD. In particular, the hybrid broadcast receiver receives the extended or the modified MPD via the terrestrial broadcasting and may be able to receive contents via the terrestrial broadcasting or broadband base on MPD. In the following, elements and attributes additionally included in the extended or modified MPD are described in a manner of being compared with a legacy MPD. In the following description, the extended or the modified MPD may be referred to as an MPD.

An MPD can be extended or modified to express an ATSC 3.0 service. An extended or modified MPD can additionally include MPD@anchorPresentationTime, Common@presentable, Common.Targeting, Common.TargetDevice and/or Common@associatedTo.

The MPD@anchorPresentationTime may indicate an anchor, i.e., base time, for presentation time of segments included in an MPD. In the following, the MPD@anchorPresentationTime can be used as effective time of an MPD. The MPD@anchorPresentationTime may indicate the earliest playback time among segments included in the MPD.

The MPD may further include common attributes and elements. The common attributes and elements can be applied to AdaptionSet, Representation and the like. The Common@presentable may indicate that a media described by the MPD corresponds to a component capable of making a presentation.

The Common.Targeting may indicate targeting properties and/or personalization properties of a media described by an MPD.

The Common.TargetDevice may indicate a target device or target devices of a media described by an MPD.

The Common@associatedTo may indicate adaptationSet and/or representation related to a media described by an MPD.

And, MPD@id, Period@id and AdaptationSet@id included in an MPD may be required to specify media contents described by the MPD. In particular, the DASH client specifies contents to be received based on an MPD using the MPD@id, the Period@id and the AdaptationSet@id included in the MPD and may be then able to deliver the contents to the ATSC 3.0 digital television control engine. And, the ATSC 3.0 digital television control engine receives the contents and may be then able to deliver the contents to the DASH client.

Figure 26:
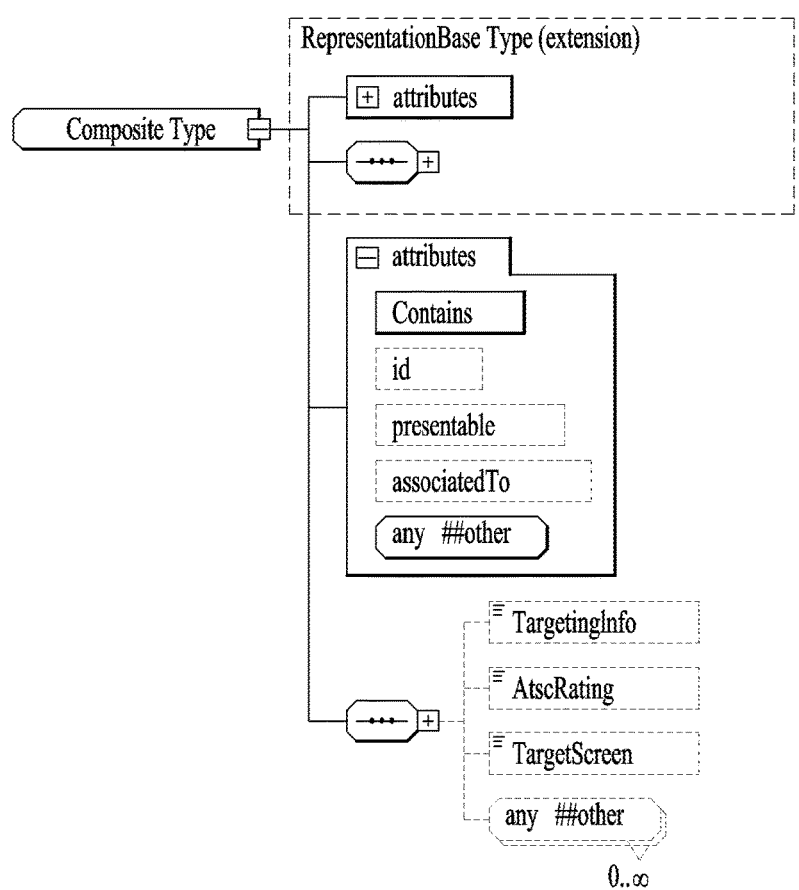
FIG. 26 is a diagram for XML schema of a composite element capable of being included in an extended MPD according to one embodiment of the present invention.

FIG. 26 is a diagram for XML schema of a composite element capable of being included in an extended MPD according to one embodiment of the present invention.

As shown in the drawing, an extended MPD can include a new composite element and the new composite element can include common attributes and common elements. In particular, a composite element can include Contains, id, presentable and/or accositedTo as attributes of the composite element.

In this case, the Contains can specify Adaptation Sets or Representations included in a composite by providing a list of @id values of the Adaptation Sets or the Representations included in the composite.

The id can specify a unique identifier for specifying a composite.

The presentable may indicate a component capable of making a presentation.

The associatedTo can specify Adaptation Sets or Representations associated with a corresponding composite.

And, a composite element can include TargetingInfo, AtscRating and/or TargetScreen as lower elements.

The TargetingInfo can indicate targeting properties and/or personalization properties of a media.

The AtscRating can indicate rating properties of a media.

The TargetScreen can indicate target screens or target devices.

FIG. 27 illustrates a format of a signaling message and syntax of a signaling section header according to one embodiment of the present invention. A format of a signaling message usable in a next generation broadcasting system may correspond to a structure including a signaling section header and signaling. The signaling section header and the signaling can be represented by a binary format or an XML format. The signaling message can be transmitted in a manner of being included in a payload of a transport protocol packet such as IP or the like. In particular, the signaling message (signaling information) can be transmitted in a manner of being included in MPEG2-TS, IP or a GS stream input inputted to an input format block of a broadcast signal transmission apparatus for the aforementioned next generation broadcasting service.

As shown in the drawing, syntax of a signaling section header can be represented by a binary format. The syntax of the signaling section header can also be represented by a different format such as XML or the like.

The signaling section header can include signaling_id, signaling_length, signaling_id_extension, protocol_version, version_number, current_next_indicator, section_number and/or last_section_number. In the present invention, signaling on an MPD can be performed using the aforementioned signaling message format and the signaling section header.

The signaling_id can indicate an identifier of a signaling message. For example, when a signaling message is represented in a section form, the signaling_id can indicate an id of a signaling table section.

The signaling_length can indicate a length of a signaling message.

The signaling_id_extension can indicate identifier extension information of a signaling message. The signaling_id_extension can be used as information for identifying signaling together with the signaling_id.

The protocol_version can indicate a protocol version of a signaling message.

The version_number can indicate version information of a signaling message. If contents included in a signaling message change, the version_number may change.

The current_next_indicator can indicate whether or not a signaling message is currently available. If a value of the current_next_indicator corresponds to '1', it may indicate that a corresponding signaling message is currently available. If a value of the current_next_indicator corresponds to '0', it may indicate that a corresponding signaling message is not available and a signaling message including the signaling_id, the signaling_id_extension, or the section_number is to be available in the future.

The section_number can indicate a section number of a current signaling message. When a single signaling message is transmitted in a manner of being divided into a plurality of sections, the section_number can be used as an identifier.

The last_section_number can indicates a number of a fragment including the last data of a corresponding signaling message when the signaling message is transmitted in a manner of being divided into a plurality of fragments.

A next generation broadcasting system can transmit MPD signaling using a hybrid scheme. In particular, the next generation broadcasting system transmits at least one or more MPD URLs at every short interval and may be able to transmit full signaling messages at every long interval. In relation to the use of an MPD, one program can include one or more show segments and one or more interstitial segments. In this case, the show segment may correspond to media contents selected by a user and the interstitial segment may correspond to an advertisement which is inserted between show segments. One MPD can include information on all show segments and each of the interstitial segments can include a single MPD. In this case, there may exist a plurality of MPDs to be referred for a single program. To this end, it is necessary for a receiver to determine when and which MPD to be used. As a first method, when a plurality of MPDs are used in a single program, it may use signaling for switching a plurality of the MPDs according to time. As a second method, when a broadcasting system transmits an MPD, if the broadcasting system transmits an effective time attribute or an anchor of presentation time attribute in advance, a receiver can selectively use a plurality of the MPDs based on effective time of each of a plurality of the MPDs.

Figure 28:
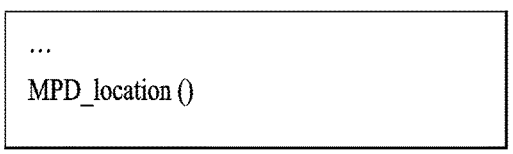
FIG. 28 illustrates a syntax structure of MPD_location for signaling a location of MPD according to one embodiment of the present invention.

FIG. 28 illustrates a syntax structure of MPD_location for signaling a location of MPD according to one embodiment of the present invention. A next generation broadcasting system can deliver a location capable of obtaining an MPD to a receiver via service signaling. MPD_location can be transmitted in a manner of being included in a payload of a transport protocol packet such as IP and the like. In particular, the MPD_location can be transmitted in a manner of being included in MPEG2-TS, IP or a GS stream input which is inputted to an input format block of a broadcast signal transmission apparatus for the aforementioned next generation broadcasting service.

The MPD_location can include IP_version_flag, source_IP_address_flag, source_IP_address, destination_IP_address, destination_port_number and/or Datapipe_id. And, the MPD_location can further include TSI (Transport Session Identifier) and/or PID (packet identifier).

The IP_version_flag can indicate an IP address format of IP datagram for a signaling channel on which an MPD is transmitted. If a value of the IP_version_flag corresponds to 0, the IP datagram for the signaling channel can use an IPv4 format. If the value of the IP_version_flag corresponds to 1, the IP datagram for the signaling channel can use an IPv6 format.

The source_IP_address_flag corresponds to a field indicating whether or not IP datagram of a signaling channel on which an MPD is transmitted includes a source_IP_address. If a value of the field corresponds to 1, it may indicate that the IP datagram includes a source_IP_address.

The source_IP_address can indicate a source_IP_address of a signaling channel on which an MPD is transmitted when a value of the aforementioned source_IP_address_flag corresponds to 1.

The destination_IP_address can indicate a destination_IP_address of IP datagram of a signaling channel on which an MPD is transmitted.

The destination_port_number can indicate UDP port number of IP datagram of a signaling channel on which an MPD is transmitted.

The Datapipe_id can indicate an identifier of a data pipe corresponding to a data transmission channel of a physical layer. The data pipe may also be referred to as a physical layer pipe and the field can indicate an identifier of a physical layer pipe in which an MPD is transmitted.

The TSI can indicate a transport session identifier. In the present invention, the TSI can indicate a TSI of an application layer transmission protocol session that transmits an MPD file. In the present invention, a transmission session identifier may correspond to Asset id of MMT.

The PID can indicate an identifier of a transmission packet. In the present invention, the PID can indicate a packet identifier of a transport stream that transmits an MPD file. For example, the PID may indicate a PID of an MPEG-2 TS (transport stream) packet or a packet ID of MPEG MMTP.

FIG. 29 illustrates a syntax structure of an MPD URL signaled in a next generation broadcast network according to one embodiment of the present invention. MPD_URL can be transmitted in a manner of being included in a payload of a transport protocol packet such as IP and the like. In particular, the MPD_URL can be transmitted in a manner of being included in MPEG2-TS, IP or a GS stream input which is inputted to an input format block of a broadcast signal transmission apparatus for the aforementioned next generation broadcasting service.

MPD_URL_section can include table_id, section_syntax_ indicator, private_indicator, private_section_length, table_id_extension, protocol_version, sequence_number, mpd_data_version, current_next_indicator, section_number, last_section_number, MPD_URL_length and/or MPD_URL_bytes( ).

The table_id can indicate that the MPD_URL_section includes service signaling in which a DASH MPD URL is included.

The section_syntax_indicator can indicate whether or not syntax of a corresponding signaling message corresponds to generic section syntax.

The private_indicator can be set to 1.

The private_section_length can indicate a length of a corresponding signaling message.

The table_id_extension can indicate identifier extension information of a corresponding signaling message. The table_id_extension can be used as information for identifying signaling together with the table_id. The table_id_extension can include protocol_version and sequence_number.

The protocol_version can indicate a protocol version of a corresponding signaling message.

The sequence_number can indicate an identifier of an MPD_URL included in a corresponding signaling message. For example, if a signaling message includes MPD URLs different from each other, the MPD URLs can be distinguished from each other using the sequence_number. In particular, when a signaling message includes MPD URLs different from each other, it may be able to make a receiver recognize that the MPD URLs different from each other are included in the signaling message in a manner of assigning a different sequence number to a signaling message header.

The mpd_data_version can indicate version information of a signaling message. If contents of an MPD included in a signaling message change, version_number may change.

The current_next_indicator can indicate whether or not a signaling message is currently available. If a value of the current_next_indicator corresponds to '1', it may indicate that a corresponding signaling message is currently available. If a value of the current_next_indicator corresponds to '0', it may indicate that a corresponding signaling message is not available and a signaling message including identical table_id, table_id_extension, or section_number is to be available in the future.

The section_number can indicate a section number of a current signaling message. When a signaling message is transmitted in a manner of being divided into a plurality of sections, the section_number can be used as an identifier.

The last_section_number can indicate a number of a fragment including the last data of a signaling message when the signaling message is transmitted in a manner of being divided into a plurality of fragments.

The MPD_URL_length can indicate a length of a URL capable of downloading an MPD file. The MPD_URL_bytes may correspond to a field including actual data of an MPD URL included in a signaling message. In the present invention, a receiver can include actual data of a URL capable of downloading an MPD file.

FIG. 30 illustrates a syntax structure of an MPD URL signaled in a next generation broadcast network according to a different embodiment of the present invention. MPD_URL can be transmitted in a manner of being included in a payload of a transport protocol packet such as IP and the like. In particular, the MPD_URL can be transmitted in a manner of being included in MPEG2-TS, IP or a GS stream input which is inputted to an input format block of a broadcast signal transmission apparatus for the aforementioned next generation broadcasting service. MPD_URL_section can include table_id, section_syntax_indicator, private_indicator, private_section_length, table_id_extension, protocol_version, sequence_number, mpd_data_version, current_next_indicator, section_number, last_section_number, MPD-id_length, MPD_id_bytes( ), MPD_URL_length and/or MPD_URL_bytes( ).

The table_id can indicate that the MPD_URL_section includes service signaling in which a DASH MPD URL is included.

The section_syntax_indicator can indicate whether or not syntax of a corresponding signaling message corresponds to generic section syntax.

The private_indicator can be set to 1.

The private_section_length can indicate a length of a corresponding signaling message.

The table_id_extension can indicate identifier extension information of a corresponding signaling message. The table_id_extension can be used as information for identifying signaling together with the table_id. The table_id_extension can include protocol_version and sequence_number.

The protocol_version can indicate a protocol version of a corresponding signaling message.

The sequence_number can indicate an identifier of an MPD URL included in a corresponding signaling message. For example, if a signaling message includes MPD URLs different from each other, the MPD URLs can be distinguished from each other using the sequence_number. In particular, when a signaling message includes MPD URLs different from each other, it may be able to make a receiver recognize that the MPD URLs different from each other are included in the signaling message in a manner of assigning a different sequence number to a signaling message header.

The mpd_data_version can indicate version information of a signaling message. If contents of an MPD included in a signaling message change, version_number may change.

The current_next_indicator can indicate whether or not a signaling message is currently available. If a value of the current_next_indicator corresponds to '1', it may indicate that a corresponding signaling message is currently available. If a value of the current_next_indicator corresponds to '0', it may indicate that a corresponding signaling message is not available and a signaling message including identical table_id, table_id_extension, or section_number is to be available in the future.

The section_number can indicate a section number of a current signaling message. When a signaling message is transmitted in a manner of being divided into a plurality of sections, the section_number can be used as an identifier.

The last_section_number can indicate a number of a fragment including the last data of a signaling message when the signaling message is transmitted in a manner of being divided into a plurality of fragments.

The MPD_id_length can indicate a length of MPD_id capable of indicating an identifier of an MPD.

The MPD_id_bytes( ) can indicates an identifier of an MPD.

The MPD_URL_length can indicate a length of a URL capable of downloading an MPD file.

The MPD_URL_bytes may correspond to a field including actual data of an MPD URL included in a signaling message. In the present invention, a receiver can include actual data of a URL capable of downloading an MPD file.

FIG. 31 illustrates a syntax structure of an MPD signaled in a next generation broadcast network according to one embodiment of the present invention. MPD can be transmitted in a manner of being included in a payload of a transport protocol packet such as IP and the like. In particular, the MPD can be transmitted in a manner of being included in MPEG2-TS, IP or a GS stream input which is inputted to an input format block of a broadcast signal transmission apparatus for the aforementioned next generation broadcasting service. MPD_section can include table_id, section_syntax_indicator, private_indicator, private_section_length, table_id_extension, mpd_data_version, current_next_indicator, section_number, last_section_number, MPD_coding, MPD_byte_length, and/or MPD_bytes( ).

The table_id can indicate that the MPD_section includes service signaling in which a DASH MPD URL is included.

The section_syntax_indicator can indicate whether or not syntax of a corresponding signaling message corresponds to generic section syntax.

The private_indicator can be set to 1.

The private_section_length can indicate a length of a corresponding signaling message.

The table_id_extension can indicate identifier extension information of a corresponding signaling message. The table_id_extension can be used as information for identifying signaling together with the table_id.

The mpd_data_version can indicate version information of a signaling message. If contents of an MPD included in a signaling message change, version_number may change.

The current_next_indicator can indicate whether or not a signaling message is currently available. If a value of the current_next_indicator corresponds to '1', it may indicate that a corresponding signaling message is currently available. If a value of the current_next_indicator corresponds to '0', it may indicate that a corresponding signaling message is not available and a signaling message including identical table_id, table_id_extension, or section_number is to be available in the future.

The section_number can indicate a section number of a current signaling message. When a signaling message is transmitted in a manner of being divided into a plurality of sections, the section_number can be used as an identifier.

The last_section_number can indicate a number of a fragment including the last data of a signaling message when the signaling message is transmitted in a manner of being divided into a plurality of fragments.

The MPD_coding can indicate a field indicating an encoding scheme of an MPD file included in a corresponding signaling message. In particular, it is able to indicate that an MPD file is encoded by an encoding scheme of a different form depending on a value of the MPD_coding. For example, if the value corresponds to '0x00', it is able to indicate that a signaling message includes an MPD file itself represented by XML. If the value corresponds to '0x01', it is able to indicate that an MPD file compressed by gzip is included in a signaling message. If a size of an MPD is sufficiently big, the MPD is transmitted via a plurality of sections. In this case, if a size encoded by gzip is greater than a single section (maximum size 4096 bytes), MPD_bytes( ) included in a plurality of the sections are combined with each other and then ungzip can be performed.

The MPD_byte_length can indicate a length of MPD_bytes( ) following after a corresponding field.

The MPD_bytes can include actual data of an MPD file included in a signaling message.

FIG. 32 illustrates a syntax structure of an MPD signaled in a next generation broadcast network according to a different embodiment of the present invention. MPD can be transmitted in a manner of being included in a payload of a transport protocol packet such as IP and the like. In particular, the MPD can be transmitted in a manner of being included in MPEG2-TS, IP or a GS stream input which is inputted to an input format block of a broadcast signal transmission apparatus for the aforementioned next generation broadcasting service. MPD_section can include table_id, section_syntax_indicator, private_indicator, private_section_length, table_id_extension, protocol_version, sequence_number, mpd_data_version, current_next_indicator, section_number, last_section_number, MPD_coding, MPD_byte_length, and/or MPD_bytes( ).

The table_id can indicate that the MPD_section includes service signaling in which a DASH MPD URL is included.

The section_syntax_indicator can indicate whether or not syntax of a corresponding signaling message corresponds to generic section syntax.

The private_indicator can be set to 1.

The private_section_length can indicate a length of a corresponding signaling message.

The table_id_extension can indicate identifier extension information of a corresponding signaling message. The table_id_extension can be used as information for identifying signaling together with the table_id.

The protocol_version can indicate a protocol version of a corresponding signaling message.

The sequence_number can indicate an identifier of an MPD included in a corresponding signaling message. For example, if a signaling message includes MPDs different from each other, the MPDs can be distinguished from each other using the sequence_number. In particular, when a signaling message includes MPDs different from each other, it may be able to make a receiver recognize that the MPDs different from each other are included in the signaling message in a manner of assigning a different sequence number to a signaling message header.

The mpd_data_version can indicate version information of a signaling message. If contents of an MPD included in a signaling message change, version_number may change.

The current_next_indicator can indicate whether or not a signaling message is currently available. If a value of the current_next_indicator corresponds to '1', it may indicate that a corresponding signaling message is currently available. If a value of the current_next_indicator corresponds to '0', it may indicate that a corresponding signaling message is not available and a signaling message including identical table_id, table_id_extension, or section_number is to be available in the future.

The section_number can indicate a section number of a current signaling message. When a signaling message is transmitted in a manner of being divided into a plurality of sections, the section_number can be used as an identifier.

The last_section_number can indicate a number of a fragment including the last data of a signaling message when the signaling message is transmitted in a manner of being divided into a plurality of fragments.

The MPD_coding can indicate a field indicating an encoding scheme of an MPD file included in a corresponding signaling message. In particular, it is able to indicate that an MPD file is encoded by an encoding scheme of a different form depending on a value of the MPD_coding. For example, if the value corresponds to '0x00', it is able to indicate that a signaling message includes an MPD file itself represented by XML. If the value corresponds to '0x01', it is able to indicate that an MPD file compressed by gzip is included in a signaling message. If a size of an MPD is sufficiently big, the MPD is transmitted via a plurality of sections. In this case, if a size encoded by gzip is greater than a single section (maximum size 4096 bytes), MPD_bytes( ) included in a plurality of the sections are combined with each other and then ungzip can be performed.

The MPD_byte_length can indicate a length of MPD_bytes( ) following after a corresponding field.

The MPD_bytes can include actual data of an MPD file included in a signaling message.

FIG. 33 illustrates a syntax structure of an MPD signaled in a next generation broadcast network according to one embodiment of the present invention. MPD can be transmitted in a manner of being included in a payload of a transport protocol packet such as IP and the like. In particular, the MPD can be transmitted in a manner of being included in MPEG2-TS, IP or a GS stream input which is inputted to an input format block of a broadcast signal transmission apparatus for the aforementioned next generation broadcasting service. MPD_section can include table_id, section_syntax_indicator, private_indicator, private_section_length, table_id_extension, mpd_data_version, current_next_indicator, section_number, last_section_number, MPD_id_length, MPD_id_bytes( ), MPD_coding, MPD_byte_length, and/or MPD_bytes( ).

The table_id can indicate that the MPD_section includes service signaling in which a DASH MPD URL is included.

The section_syntax_indicator can indicate whether or not syntax of a corresponding signaling message corresponds to generic section syntax.

The private_indicator can be set to 1.

The private_section_length can indicate a length of a corresponding signaling message.

The table_id_extension can indicate identifier extension information of a corresponding signaling message. The table_id_extension can be used as information for identifying signaling together with the table_id.

The mpd_data_version can indicate version information of a signaling message. If contents of an MPD included in a signaling message change, version_number may change.

The current_next_indicator can indicate whether or not a signaling message is currently available. If a value of the current_next_indicator corresponds to E, it may indicate that a corresponding signaling message is currently available. If a value of the current_next_indicator corresponds to '0', it may indicate that a corresponding signaling message is not available and a signaling message including identical table_id, table_id_extension, or section_number is to be available in the future.

The section_number can indicate a section number of a current signaling message. When a signaling message is transmitted in a manner of being divided into a plurality of sections, the section_number can be used as an identifier.

The last_section_number can indicate a number of a fragment including the last data of a signaling message when the signaling message is transmitted in a manner of being divided into a plurality of fragments.

The MPD_id_length can indicate a length of MPD_id capable of indicating an identifier of an MPD.

The MPD_id_bytes( ) can indicate an identifier of an MPD.

When an identical table_id, table_id_extension, section_number or MPD_id_bytes is duplicately received, a receiver of a next generation broadcasting system can prevent duplicated calculation from being performed. Moreover, in case of a signaling message including an identical table_id, table_id_extension, section_number or MPD_id_ bytes, the receiver checks a value of mpd_data_version. If version changes, the receiver can perform such an operation as updating an MPD file associated with MPD_id.

The MPD_coding can indicate a field indicating an encoding scheme of an MPD file included in a corresponding signaling message. In particular, it is able to indicate that an MPD file is encoded by an encoding scheme of a different form depending on a value of the MPD_coding. For example, if the value corresponds to '0x00', it is able to indicate that a signaling message includes an MPD file itself represented by XML. If the value corresponds to '0x01', it is able to indicate that an MPD file compressed by gzip is included in a signaling message. If a size of an MPD is sufficiently big, the MPD is transmitted via a plurality of sections. In this case, if a size encoded by gzip is greater than a single section (maximum size 4096 bytes), MPD_bytes( ) included in a plurality of the sections are combined with each other and then ungzip can be performed.

The MPD_byte_length can indicate a length of MPD_bytes( ) following after a corresponding field.

The MPD_bytes can include actual data of an MPD file included in a signaling message.

Figures 34, 35:
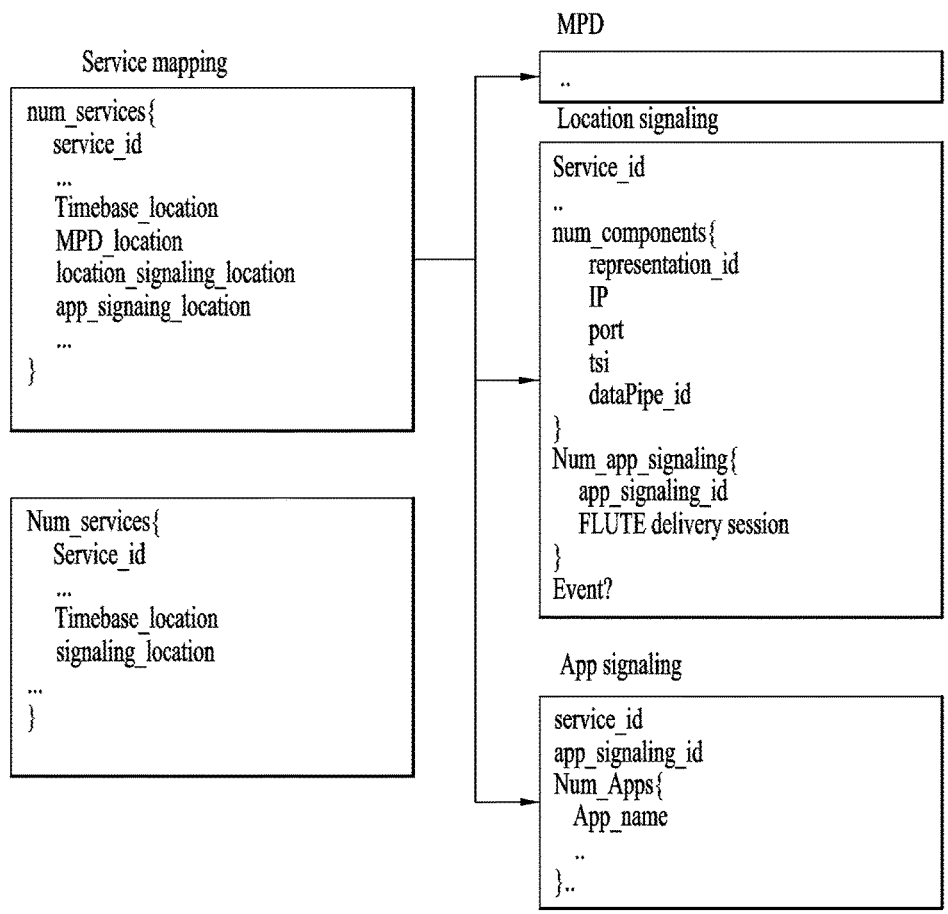
FIG. 34 illustrates a syntax structure for location signaling according to one embodiment of the present invention.
FIG. 35 illustrates a syntax structure for service mapping signaling according to one embodiment of the present invention.

FIG. 34 illustrates a syntax structure for location signaling according to one embodiment of the present invention. The location signaling can be transmitted in a manner of being included in a payload of an application layer transport protocol packet such as IP and the like. In particular, the location signaling can be transmitted in a manner of being included in MPEG2-TS, IP, or a GS stream input which is inputted to an input format block of a broadcast signal transmission apparatus for the aforementioned next generation broadcasting service. A next generation broadcasting system can deliver information on a location capable of obtaining location signaling including a broadcast transmission parameter according to a component to a receiver via signaling. And, the next generation broadcasting system can deliver information on a location capable of obtaining application-related signaling to the receiver via signaling. The location signaling corresponds to signaling for mapping the aforementioned total representation ID (fully qualified representation ID) to transport parameters of a broadcast stream. In this case, the transport parameters may correspond to an IP address, a port, a TSI, a PID, or a physical data pipe. The location signaling can include service_id, representation_id, IP_address, port, tsi, pid, dataPipe_id, app_signaling_id and/or Flute delivery session information and the like. In this case, the representation_id, the ip_address, the port, the tsi, the pid and the dataPipe_id correspond to component-related information and the app_signaling_id and the Flute delivery session may correspond to application signaling-related information.

The service-id can indicate an identifier of a service.

The Representation_id corresponds to a field for identifying representation and may be able to include an identifier of Period and an identifier of Representation in an MPD at the same time.

The IP_address can indicate an IP_address of IP datagram including a component.

The port can indicate UDP port number of IP datagram including a component.

The tsi can indicate a TSI (transport session identifier) value of an application layer transport protocol packet such as ALC+/LCT+ including a component or a TSI (transport session identifier) of a FLUTE session transmitting the TSI value. In the present invention, the TSI may correspond to Asset id of MMT.

The pid can indicate an identifier of a transmission packet.

The app_signaling_id can indicate an identifier of signaling including application-related information. The FLUTE delivery session can indicate information on a FLUTE session transmitting application-related data.

As mentioned in the foregoing description, the location signaling according to the present invention maps the Representation_id to transport parameters to enable an ALC/LCT+ client to specify a component to be processed according to a request of a DASH client.

A next generation broadcasting system can deliver information on each service to a receiver in a manner of transmitting service mapping signaling. When the next generation broadcasting system performs the service mapping signaling, the next generation broadcasting system can use a different method according to each service. The next generation broadcasting system can perform the service mapping signaling using an MPD with respect to a streaming service. The next generation broadcasting system can perform component-level signaling using an MPD with respect to a streaming service. One MPD can include a plurality of service components included in a service. In particular, one MPD can include information on a plurality of service components including various resolutions and encoding schemes included in a single service.

The next generation broadcasting system can use signaling similar to NRT-IT (non-real time information table) or GAT (guide access table) of an ATSC-M/H system with respect to an NRT service.

The next generation broadcasting system can use an extended TPT (TDO parameters table) with respect to application signaling. In this case, the TDO is an abbreviation of a triggered declarative object.

The next generation broadcasting system can deliver a trigger via in-band event signaling in an MPD or an event stream.

FIG. 35 illustrates a syntax structure for service mapping signaling according to one embodiment of the present invention. Service mapping signaling can be transmitted in a manner of being included in a payload of a transport protocol packet such as IP and the like. In particular, the service mapping signaling can be transmitted in a manner of being included in MPEG2-TS, IP or a GS stream input which is inputted to an input format block of a broadcast signal transmission apparatus for the aforementioned next generation broadcasting service. The service mapping signaling can include information related to a service such as a service ID and the like, a path capable of obtaining timebase-related signaling applicable in a service, a path capable of obtaining DASH MPD-related signaling, a path capable of obtaining location signaling including a broadcast transmission parameter according to a component and/or a path capable of obtaining application signaling including application-related information.

The service mapping signaling can include service_id, Timebase_location, MPD_location, location_signaling_location and/or app_signaling_location for each service.

The Timebase_location can indicate a path capable of obtaining timebase-related signaling applicable in a service.

The MPD_location can include the aforementioned MPD_ location syntax structure. The MPD_location can indicate a path capable of obtaining DASH MPD-related signaling.

The location_signaling_location can indicate a path capable of obtaining location signaling including a broadcast transport parameter according to a component. In particular, a receiver can obtain the aforementioned location signaling based on the location_signaling_location. As shown in the drawing, the location signaling can include service_id, representation_id, IP_address, port, tsi, pid, dataPipe_id, app_signaling_id, Flute delivery session and/or Event. In this case, the representation_id, the IP_address, the port, the tsi, and the dataPipe_id correspond to component-related information and the app_signaling_id and the Flute delivery session may correspond to signaling-related information. Detail explanation on each field is identical to what is mentioned earlier in the foregoing description.

The app_signaling_location can indicate a path capable of obtaining application signaling including application-related information. The app_signaling can include service_id, app_signaling_id and/or app_name. The app_signaling_id can indicate an identifier of application signaling and the app_name can indicate a name of each application.

Figure 36:
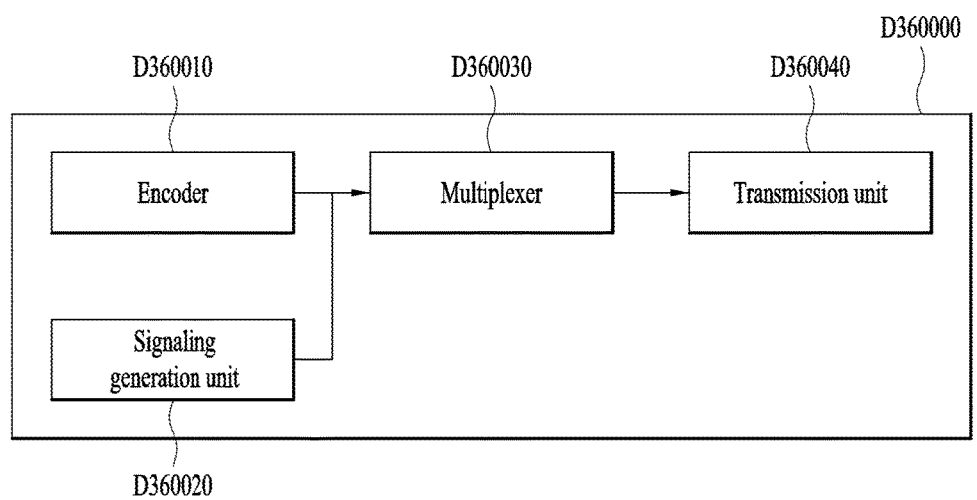
FIG. 36 illustrates a hybrid broadcast transmission apparatus according to one embodiment of the present invention.

FIG. 36 illustrates a hybrid broadcast transmission apparatus according to one embodiment of the present invention. A hybrid broadcast transmission apparatus according to the present invention can transmit a broadcast signal in a manner of including a media stream and signaling information in the broadcast signal. The hybrid broadcast transmission apparatus can transmit the signaling information in a manner of including metadata for the media stream in the signaling information. The metadata may correspond to information related to an MPD of a DASH system or the MPD. The MPD can include information on a media stream transmitted via a broadband. The hybrid broadcast transmission apparatus D360000 can include an encoder D360010, a signaling generation unit D360020, a multiplexer D360030 and/or a transmission unit D360040.

The encoder D360010 can encode a media data to a media stream.

The signaling generation unit D360020 can generate signaling information for signaling a media stream. As mentioned in the foregoing description, the signaling information can include metadata on the media stream. In this case, the media stream can include not only terrestrial broadcasting but also a media stream transmitted via a broadband. And, the metadata can include an MPD including information on a DASH segment transmitted via a broadband. In this case, the MPD can include an address for accessing the DASH segment or the media stream. The address for accessing the media stream may correspond to HTTP URL (hypertext transfer protocol uniform resource locator). The signaling information can include URL information capable of downloading an MPD (media presentation description) or an MPD. The MPD included in the signaling information can further include information on an encoding scheme of the MPD and a field for identifying the MPD.

The multiplexer D360030 multiplexes the media stream and the signaling information and may be then able to generate a broadcast signal. In this case, the broadcast signal can include MPEG2-TS, IP, or a GS stream input which is inputted to an input format block of a broadcast signal transmission apparatus for the aforementioned next generation broadcasting service.

The transmission unit D360040 can transmit the generated broadcast signal.

Figure 37:
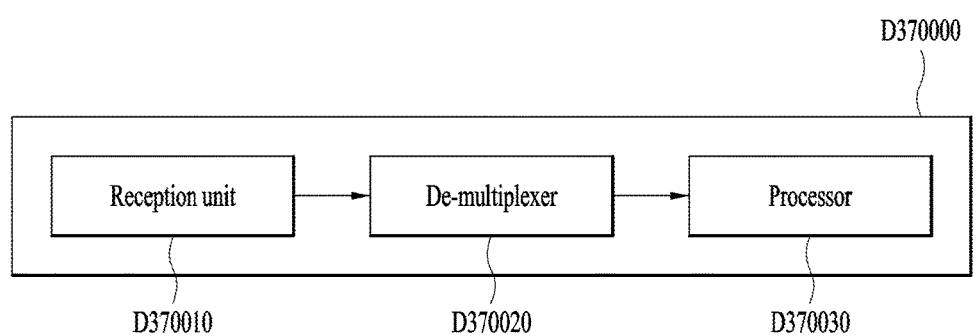
FIG. 37 illustrates a hybrid broadcast reception apparatus according to one embodiment of the present invention.

FIG. 37 illustrates a hybrid broadcast reception apparatus according to one embodiment of the present invention.

A hybrid broadcast reception apparatus can receive a broadcast signal including a media stream and signaling information. The hybrid broadcast reception apparatus can parse metadata on the media stream included in the signaling information and the metadata may correspond to information on an MPD of a DASH system or information on the MPD. The MPD can include information on a media stream received via a broadband. The hybrid broadcast reception apparatus D370000 can include a reception unit D370010, a demultiplexer D370020 and/or a processor D370030.

The reception unit D370010 can receive a terrestrial broadcasting signal. In this case, the broadcast signal can include a multiplexed media stream and signaling information for signaling the media stream. An operation of the reception unit D370010 can be identically performed by the aforementioned tuner.

The de-multiplexer D370020 de-multiplexes the received broadcast signal and may be then able to obtain a media stream and signaling information. The signaling information is parsed by the aforementioned signaling parser and the hybrid broadcast reception apparatus may be able to obtain metadata on the media stream.

The processor D370030 can obtain a media stream received via a broadband using the metadata. In this case, the metadata may correspond to an MPD. An operation of the processor D370030 can be performed by the aforementioned DASH client.

As mentioned in the foregoing description, the hybrid broadcast reception apparatus can obtain the metadata on the media stream capable of being received via a broadband using the signaling information received from the terrestrial broadcast signal. And, the hybrid broadcast reception apparatus can receive a media stream or a segment via a broadband using the obtained metadata.

Figure 38:
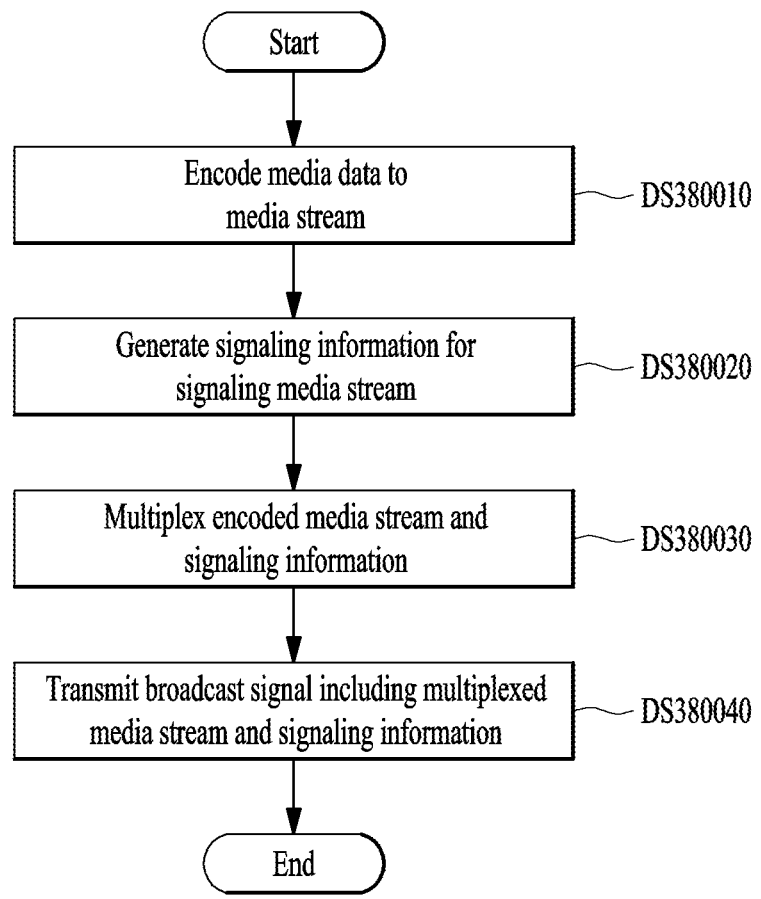
FIG. 38 illustrates a hybrid broadcast transmission method according to one embodiment of the present invention.

FIG. 38 illustrates a hybrid broadcast transmission method according to one embodiment of the present invention.

According to a hybrid broadcast transmission method, it may be able to transmit a broadcast signal in a manner of including a media stream and signaling information in the broadcast signal. According to the hybrid broadcast transmission method, it may be able to transmit the signaling information in a manner of including metadata on the media stream in the signaling information and the metadata may correspond to information on an MPD of a DASH system or information on the MPD. The MPD can include information on a media stream transmitted via a broadband. The hybrid broadcast transmission method can be performed as follows.

The hybrid broadcast transmission apparatus can encode a media data into a media stream [DS380010].

The hybrid broadcast transmission apparatus can generate signaling information for signaling a media stream [DS380020]. As mentioned in the foregoing description, the signaling information can include metadata on the media stream. In this case, the media stream can include not only terrestrial broadcasting but also a media stream transmitted via a broadband. And, the metadata can include an MPD including information on a DASH segment transmitted via a broadband. In this case, the MPD can include an address for accessing the DASH segment or the media stream. The address for accessing the media stream may correspond to HTTP URL (hypertext transfer protocol uniform resource locator). The signaling information can include URL information capable of downloading an MPD (media presentation description) or an MPD. The MPD included in the signaling information can further include information on an encoding scheme of the MPD and a field for identifying the MPD.

The hybrid broadcast transmission apparatus multiplexes the media stream and the signaling information and may be then able to generate a broadcast signal [DS380030]. In this case, the broadcast signal can include MPEG2-TS, IP, or a GS stream input which is inputted to an input format block of a broadcast signal transmission apparatus for the aforementioned next generation broadcasting service.

The hybrid broadcast transmission apparatus can transmit a broadcast signal including a media stream and signaling information [DS380040].

Figure 39:
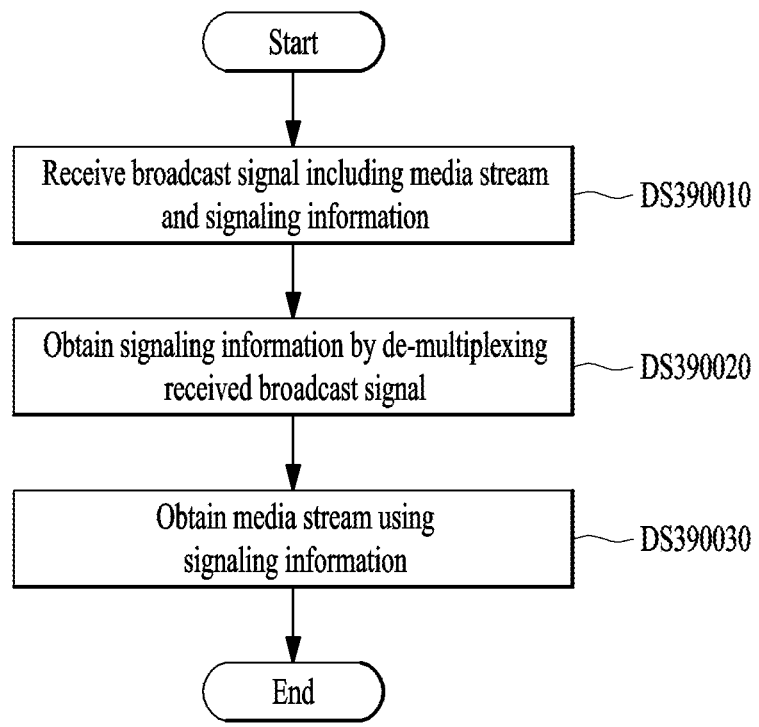
FIG. 39 illustrates a hybrid broadcast reception method according to one embodiment of the present invention.

FIG. 39 illustrates a hybrid broadcast reception method according to one embodiment of the present invention.

According to a hybrid broadcast reception method, it may be able to receive a broadcast signal including a media stream and signaling information. According to the hybrid broadcast reception method, it may be able to parse metadata on the media stream included in the signaling information and the metadata may correspond to information on an MPD of a DASH system or information on the MPD. The MPD can include information on a media stream received via a broadband. The hybrid broadcast reception method can be performed as follows.

The hybrid broadcast reception apparatus can receive a broadcast signal [DS390010]. In this case, the broadcast signal can include a multiplexed media stream and signaling information for signaling the media stream.

The hybrid broadcast reception apparatus de-multiplexes the broadcast signal and may be then able to obtain signaling information [DS390020]. The signaling information is parsed by the aforementioned signaling parser and the hybrid broadcast reception apparatus may be able to obtain metadata on the media stream.

The hybrid broadcast reception apparatus can obtain a media stream using the signaling information. In this case, the signaling information may correspond to the aforementioned extended MPD. An operation of the hybrid broadcast reception apparatus can be performed by the aforementioned DASH client.

As mentioned in the foregoing description, according to the hybrid broadcast reception method, it may be able to obtain the metadata on the media stream capable of being received via a broadband using the signaling information received from the terrestrial broadcast signal. And, according to the hybrid broadcast reception method, it may be able to receive a media stream or a segment via a broadband using the obtained metadata.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A module, a processing unit, a device or a unit may correspond to processors configured to execute continuous processes stored in a memory (or a storing unit). Each of the steps described in the aforementioned embodiments can be performed by hardware/processors. Each of the modules/blocks/units described in the aforementioned embodiments can operate as hardware/processor. The methods proposed by the present invention can be executed by codes. The codes can be written on a storing media readable by a processor. Hence, the codes can be read by a processor provided by an apparatus.

All method inventions according to the present invention are implemented in a type of a program command capable of being performed by various computer means and can be recorded on a media readable by a computer.

The recording media readable by the computer can independently include a program command, a data file, a data structure or a combination thereof. The program command recorded on the media may correspond to program commands specially designed or configured for the present invention or program commands well-known to those skilled in the art. The examples of the recording media readable by the computer may include a ROM, a RAM, a CD-ROM, a magnetic tape, a floppy disc, an optical data storing device and the like. And, implementing in a form of a carrier wave such as transmission via the Internet and the like is also included. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification.

Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

MODE FOR INVENTION

Various embodiments have been described in the best mode for carrying out the invention.

INDUSTRIAL APPLICABILITY

The present invention is available in a series of broadcast signal provision fields.

What is claimed is:

1. A method for transmitting a broadcast signal by an apparatus for transmitting a broadcast signal, the method comprising:
    encoding service data;
    generating first signaling information providing information related to at least one service, wherein the first signaling information includes service identifier (ID) information for identifying a service and information to acquire a Media Presentation Description (MPD) related to the service;
    encapsulating the encoded service data and the first signaling information into packets; and
    transmitting the broadcast signal including the packets,
    wherein the information to acquire the MPD includes an IP address and a port number, and
    wherein the packets further include a physical layer ID corresponding to a physical layer path carrying the MPD.

2. The method of claim 1, wherein the information to acquire the MPD includes URL information for downloading the MPD.

3. An apparatus for transmitting a broadcast signal, the apparatus comprising:
    an encoder to encode service data;
    a signaling generator to generate first signaling information providing information related to at least one service, wherein the first signaling information includes service identifier (ID) information for identifying a service and information to acquire a Media Presentation Description (MPD) related to the service;
    an encapsulator to encapsulate the encoded service data and the first signaling information into packets; and
    a transmitter to transmit the broadcast signal including the packets,
    wherein the information to acquire the MPD includes an IP address and a port number, and
    wherein the packets further include a physical layer ID corresponding to a physical layer path carrying the MPD.

4. The apparatus of claim 3, wherein the information to acquire the MPD includes URL information for downloading the MPD.

5. A method for receiving a broadcast signal by an apparatus for receiving a broadcast signal, the method comprising:
    receiving the broadcast signal including packets, wherein the packets include service data and first signaling information;
    decapsulating the broadcast signal and acquiring the first signaling information providing information related to at least one service, wherein the first signaling information includes service identifier (ID) information for identifying a service and information to acquire a Media Presentation Description (MPD) related to the service; and
    decoding the service data by using the first signaling information,
    wherein the information to acquire the MPD includes an IP address and a port number, and
    wherein the packets further include a physical layer ID corresponding to a physical layer path carrying the MPD.

6. An apparatus of receiving a broadcast signal, the apparatus comprising:
    a receiver to receive the broadcast signal including packets, wherein the packets include service data and first signaling information;

a decapsulator to decapsulate the broadcast signal and acquire the first signaling information providing information related to at least one service, wherein the first signaling information includes service identifier (ID) information for identifying a service and information to acquire a Media Presentation Description (MPD) related to the service; and a decoder to decode the service data by using the first signaling information, wherein the information to acquire the MPD includes an IP address and a port number, and wherein the packets further include a physical layer ID corresponding to a physical layer path carrying the MPD.

* * * * *